US012617563B2

(12) United States Patent
Andreev

(10) Patent No.: US 12,617,563 B2
(45) Date of Patent: May 5, 2026

(54) PAYLOAD (VARIANTS) AND AIR TRANSPORT SYSTEM (VARIANTS) COMPRISING SAME

(71) Applicant: Pavel Ruslanovich Andreev, Saint-Petersburg (RU)

(72) Inventor: Pavel Ruslanovich Andreev, Saint-Petersburg (RU)

(73) Assignee: Pavel Ruslanovich Andreev, Saint-Petersburg (RU)

( * ) Notice: Subject to any disclaimer, the term of this patent is extended or adjusted under 35 U.S.C. 154(b) by 0 days.

(21) Appl. No.: 19/064,143

(22) Filed: Feb. 26, 2025

(65) Prior Publication Data

US 2025/0289599 A1    Sep. 18, 2025

(30) Foreign Application Priority Data

Mar. 18, 2024    (RU) ........................... RU2024107042

(51) Int. Cl.
| | |
|---|---|
| *B64U 70/97* | (2023.01) |
| *B64U 10/14* | (2023.01) |
| *B64U 30/293* | (2023.01) |
| *B64U 50/14* | (2023.01) |
| *B64U 70/99* | (2023.01) |
| *B64U 101/61* | (2023.01) |

(52) U.S. Cl.
CPC .............. *B64U 70/97* (2023.01); *B64U 10/14* (2023.01); *B64U 30/293* (2023.01); *B64U 50/14* (2023.01); *B64U 70/99* (2023.01); *B64U 2101/61* (2023.01)

(58) Field of Classification Search
CPC ...... B64U 70/97; B64U 10/14; B64U 30/293; B64U 50/14; B64U 70/99; B64U 2101/61; B64U 10/13; B64U 20/40; B64U 80/82; B64U 70/30; B64U 2101/60; B64U 20/70; B64C 37/02; B64D 1/10; B64D 5/00; B64D 11/00
See application file for complete search history.

(56) References Cited

U.S. PATENT DOCUMENTS

| | | | | |
|---|---|---|---|---|
| 3,003,717 A | * | 10/1961 | Booker ..................... | B64D 5/00 |
| | | | | 244/114 R |
| 3,070,326 A | * | 12/1962 | Alan ................... | B64C 29/0041 |
| | | | | 244/2 |
| 3,210,029 A | * | 10/1965 | Brusch ..................... | B64F 1/02 |
| | | | | 244/114 R |

(Continued)

*Primary Examiner* — Medhat Badawi
(74) *Attorney, Agent, or Firm* — Taft Stettinius & Hollister LLP

(57) ABSTRACT

A payload including a housing provided with one or more toothed guides or with one or more docking mechanisms, each of which is configured to detachably toothedly interact with an unmanned aircraft apparatus being docked so as to enable the movement of said docked unmanned aircraft apparatus with respect to the housing of the payload, wherein the housing of the payload is further configured to detachably toothedly interact with yet another (other) unmanned aircraft apparatus so as to enable the action of said yet another unmanned aircraft apparatus onto said docked unmanned aircraft apparatus for withdrawal of the latter from interaction with the housing of the payload. Furthermore, embodiments of an air transport system include two or more unmanned aircraft apparatuses and one of the payload.

41 Claims, 5 Drawing Sheets

(56) References Cited

U.S. PATENT DOCUMENTS

| | | | | |
|---|---|---|---|---|
| 3,298,633 | A * | 1/1967 | Dastoli | B64C 29/0033 |
| | | | | D12/326 |
| 3,567,159 | A * | 3/1971 | Klein | B64F 1/36 |
| | | | | 244/114 R |
| 3,568,953 | A * | 3/1971 | Beezley | B64C 29/00 |
| | | | | 244/2 |
| 3,601,342 | A * | 8/1971 | Piasecki | B64D 1/22 |
| | | | | 212/230 |
| D228,688 | S * | 10/1973 | Kelly | D12/334 |
| 3,817,479 | A * | 6/1974 | Crowley | B60V 1/00 |
| | | | | 244/17.11 |
| 4,379,533 | A * | 4/1983 | Caldwell | B64C 39/02 |
| | | | | 244/140 |
| 4,617,084 | A * | 10/1986 | Potard | C30B 15/24 |
| | | | | 117/900 |
| 4,659,421 | A * | 4/1987 | Jewett | C30B 15/30 |
| | | | | 117/936 |
| 4,678,141 | A * | 7/1987 | Sarrantonio | B64D 5/00 |
| | | | | 244/63 |
| 4,802,639 | A * | 2/1989 | Hardy | B64G 1/14 |
| | | | | D12/342 |
| 4,917,329 | A * | 4/1990 | Vollmerhausen | B64D 5/00 |
| | | | | 244/2 |
| 5,000,398 | A * | 3/1991 | Rashev | B64D 5/00 |
| | | | | 244/116 |
| 5,470,033 | A * | 11/1995 | Tsai | B64F 1/10 |
| | | | | 244/116 |
| 7,093,798 | B2 * | 8/2006 | Whelan | B64C 1/065 |
| | | | | 244/120 |
| 7,357,352 | B2 * | 4/2008 | Speer | B64U 30/20 |
| | | | | 244/2 |
| 7,568,658 | B2 * | 8/2009 | Li | B64F 1/02 |
| | | | | 244/116 |
| 7,966,872 | B2 * | 6/2011 | Lutke | B64D 5/00 |
| | | | | 73/147 |
| 8,950,698 | B1 * | 2/2015 | Rossi | B64C 39/003 |
| | | | | 244/63 |
| 9,010,690 | B1 * | 4/2015 | Al-Heraibi | B64D 17/00 |
| | | | | 244/100 R |
| D732,458 | S * | 6/2015 | Dutertre | D21/447 |
| D733,029 | S * | 6/2015 | Dutertre | D21/447 |
| 9,139,309 | B1 * | 9/2015 | Al-Heraibi | B64F 1/025 |
| 9,302,768 | B2 * | 4/2016 | Yang | B64C 25/04 |
| 9,630,712 | B1 * | 4/2017 | Carmack | B64U 50/13 |
| 9,656,765 | B2 * | 5/2017 | von Flotow | B64F 1/0295 |
| 9,656,768 | B2 * | 5/2017 | Vuong | B64D 5/00 |
| 9,758,247 | B2 * | 9/2017 | Alber | B64C 29/02 |
| 9,868,526 | B2 * | 1/2018 | Yates | B64U 10/25 |
| 9,896,208 | B2 * | 2/2018 | Retig | B64D 5/00 |
| 9,981,734 | B2 * | 5/2018 | Ivans | B64D 35/04 |
| 10,029,803 | B1 * | 7/2018 | Larsen | B64U 50/39 |
| 10,133,272 | B2 * | 11/2018 | Davidson | G01S 19/13 |
| 10,137,983 | B2 * | 11/2018 | Horn | B64U 10/20 |
| 10,144,511 | B2 * | 12/2018 | von Flotow | B64D 1/12 |
| 10,179,648 | B2 * | 1/2019 | Chin | B64D 5/00 |
| 10,183,741 | B2 * | 1/2019 | Roeseler | B64U 70/20 |
| 10,266,250 | B2 * | 4/2019 | Shue | B64C 13/04 |
| 10,279,902 | B2 * | 5/2019 | Childress | B64U 70/83 |
| 10,293,929 | B2 * | 5/2019 | von Flotow | B64U 70/20 |
| 10,293,934 | B2 * | 5/2019 | Christensen | B64U 30/291 |
| 10,343,794 | B2 * | 7/2019 | Conyers | H02S 99/00 |
| 10,399,702 | B2 * | 9/2019 | McGeer | B64U 10/20 |
| 10,414,493 | B2 * | 9/2019 | McGeer | B64U 70/30 |
| 10,453,022 | B2 * | 10/2019 | Gil | G06Q 10/0832 |
| 10,518,873 | B2 * | 12/2019 | Netzer | B64C 39/12 |
| 10,562,623 | B1 * | 2/2020 | Sloan | G05D 1/0858 |
| 10,589,854 | B2 * | 3/2020 | Alber | B64C 29/0033 |
| 10,589,859 | B2 * | 3/2020 | Foo | B64U 70/20 |
| 10,696,420 | B2 * | 6/2020 | von Flotow | F15B 9/14 |
| 10,703,480 | B1 * | 7/2020 | Thrun | B64F 1/35 |
| 10,730,626 | B2 * | 8/2020 | Gil | B64D 1/22 |
| 10,752,357 | B2 * | 8/2020 | von Flotow | B64U 70/20 |
| 10,775,792 | B2 * | 9/2020 | Cooper | B64D 1/00 |
| 10,793,271 | B2 * | 10/2020 | Demonfort | B64D 5/00 |
| 10,919,629 | B2 * | 2/2021 | Gull | B64C 25/00 |
| D913,194 | S * | 3/2021 | Duffy | D12/328 |
| 10,933,996 | B2 * | 3/2021 | Gamble | B64U 50/13 |
| 10,933,997 | B2 * | 3/2021 | Hayes | B64U 10/14 |
| 10,988,251 | B2 * | 4/2021 | Georges | B64D 47/02 |
| 10,988,257 | B2 * | 4/2021 | von Flotow | B64U 70/20 |
| 11,027,844 | B2 * | 6/2021 | von Flotow | B64F 1/222 |
| 11,111,019 | B2 * | 9/2021 | Pinto | B64D 5/00 |
| 11,148,799 | B2 * | 10/2021 | Robertson | B64D 27/33 |
| 11,204,612 | B2 * | 12/2021 | von Flotow | B64U 10/13 |
| 11,209,573 | B2 * | 12/2021 | Fendell | G08G 5/21 |
| 11,217,105 | B2 * | 1/2022 | Mahkonen | G08G 5/32 |
| 11,235,892 | B2 * | 2/2022 | von Flotow | B64F 1/0295 |
| 11,267,398 | B2 * | 3/2022 | Sorokin | G08G 1/096791 |
| 11,312,489 | B2 * | 4/2022 | Skladman | B64D 17/80 |
| 11,312,492 | B1 * | 4/2022 | von Flotow | B64U 10/13 |
| 11,319,064 | B1 * | 5/2022 | Wittmaak, Jr. | B64D 9/003 |
| 11,325,698 | B2 * | 5/2022 | Millhouse | B64C 37/02 |
| 11,353,870 | B2 * | 6/2022 | Huang | G05D 1/0088 |
| 11,372,400 | B1 * | 6/2022 | Scott | B60F 5/003 |
| 11,414,187 | B2 * | 8/2022 | von Flotow | B64F 1/025 |
| 11,442,473 | B2 * | 9/2022 | Liu | G06K 19/06037 |
| 11,443,643 | B2 * | 9/2022 | Moon | G08G 5/59 |
| 11,445,510 | B2 * | 9/2022 | Takács | G08G 5/30 |
| 11,514,799 | B2 * | 11/2022 | Ladurini | G08G 5/55 |
| 11,524,797 | B2 * | 12/2022 | von Flotow | B64U 10/25 |
| 11,535,372 | B2 * | 12/2022 | Tian | B64U 50/13 |
| 11,608,168 | B2 * | 3/2023 | Polus | B64D 1/22 |
| 11,639,218 | B2 * | 5/2023 | Sinha | B64C 27/82 |
| | | | | 244/56 |
| 11,639,219 | B2 * | 5/2023 | McLaren | B64D 27/31 |
| | | | | 244/7 A |
| 11,667,398 | B2 * | 6/2023 | von Flotow | B64U 10/50 |
| | | | | 244/63 |
| 11,673,657 | B2 * | 6/2023 | Duffy | B64C 27/006 |
| | | | | 416/247 R |
| 11,772,789 | B2 * | 10/2023 | Bianco Mengotti | B64C 9/00 |
| | | | | 244/7 B |
| 11,815,888 | B1 * | 11/2023 | Mestler | B64D 5/00 |
| 11,817,001 | B2 * | 11/2023 | Mahkonen | H04W 4/027 |
| 11,820,508 | B2 * | 11/2023 | Tian | B64C 39/024 |
| 11,884,175 | B2 * | 1/2024 | Lacaze | B60L 53/36 |
| 11,964,783 | B2 * | 4/2024 | Tao | B64U 80/82 |
| 11,970,285 | B2 * | 4/2024 | Georges | G08G 5/21 |
| 11,975,834 | B2 * | 5/2024 | Shurie | B64D 11/062 |
| 12,054,251 | B2 * | 8/2024 | Kanda | B64F 1/12 |
| 12,054,256 | B2 * | 8/2024 | Blake | B64C 1/20 |
| 12,065,237 | B2 * | 8/2024 | Fink | B64C 27/20 |
| 12,145,753 | B2 * | 11/2024 | Bitar | B64U 50/14 |
| 12,168,512 | B2 * | 12/2024 | Blake | B64D 1/22 |
| 12,211,391 | B2 * | 1/2025 | Moon | B64C 39/024 |
| 12,319,446 | B2 * | 6/2025 | Bohm | B64U 30/29 |
| 12,354,031 | B2 * | 7/2025 | Goja | G06T 7/0002 |
| 12,371,199 | B2 * | 7/2025 | Gopala Suraj | B64U 20/70 |
| 12,404,047 | B2 * | 9/2025 | Crockford | B64U 60/40 |
| 12,508,707 | B2 * | 12/2025 | Troy | B25J 9/1664 |
| 12,508,970 | B2 * | 12/2025 | Hashimoto | B60P 1/483 |
| 12,515,828 | B2 * | 1/2026 | Melcher | B64U 30/12 |
| 2002/0074454 | A1 * | 6/2002 | Henderson | B64U 70/20 |
| | | | | 244/135 A |
| 2004/0090511 | A1 * | 5/2004 | Silverbrook | B41J 2/00 |
| | | | | 347/104 |
| 2013/0037650 | A1 * | 2/2013 | Heppe | B64C 37/02 |
| | | | | 244/2 |
| 2016/0009413 | A1 * | 1/2016 | Lee | G08G 5/57 |
| | | | | 701/16 |
| 2016/0167776 | A1 * | 6/2016 | Shaw | B64C 27/28 |
| | | | | 244/6 |
| 2016/0196756 | A1 * | 7/2016 | Prakash | B64U 80/25 |
| | | | | 701/3 |
| 2016/0236772 | A1 * | 8/2016 | Tang | B64U 10/14 |
| 2016/0304217 | A1 * | 10/2016 | Fisher | B64F 1/222 |
| 2016/0378108 | A1 * | 12/2016 | Paczan | G06Q 10/083 |
| | | | | 705/330 |
| 2017/0029104 | A1 * | 2/2017 | Kim | B64D 1/22 |
| 2017/0190422 | A1 * | 7/2017 | Beaman | B64U 30/20 |
| 2017/0203843 | A1 * | 7/2017 | Chan | B64D 1/08 |

(56) References Cited

U.S. PATENT DOCUMENTS

| | | | |
|---|---|---|---|
| 2017/0233053 A1* | 8/2017 | High | G08G 5/32 |
| | | | 244/2 |
| 2017/0240276 A1* | 8/2017 | Zilberstein | B64U 70/20 |
| 2017/0283054 A1* | 10/2017 | Wang | G08G 5/80 |
| 2017/0369169 A1* | 12/2017 | Lee | B64U 10/16 |
| 2018/0044000 A1* | 2/2018 | Venturelli | B64C 25/405 |
| 2018/0072415 A1* | 3/2018 | Cantrell | B64D 1/10 |
| 2018/0126871 A1* | 5/2018 | Martinotti | B60L 15/36 |
| 2018/0155027 A1* | 6/2018 | Gil | G06Q 10/0832 |
| 2018/0194469 A1* | 7/2018 | Evans | B64D 9/00 |
| 2018/0231971 A1* | 8/2018 | Greenberger | B64U 50/34 |
| 2018/0237086 A1* | 8/2018 | Evans | B60L 53/14 |
| 2018/0276993 A1* | 9/2018 | Chow | G08G 5/56 |
| 2018/0330319 A1* | 11/2018 | Liang | G08G 1/202 |
| 2019/0092468 A1* | 3/2019 | Deutsch | B64D 1/22 |
| 2019/0389575 A1* | 12/2019 | Kirkbride | B64U 50/19 |
| 2020/0017218 A1* | 1/2020 | Ahmad | B64D 9/00 |
| 2020/0115053 A1* | 4/2020 | Drennan | B64U 10/60 |
| 2020/0172245 A1* | 6/2020 | Thrun | B64D 11/06 |
| 2020/0231392 A1* | 7/2020 | Singh | B65G 61/00 |
| 2020/0339256 A1* | 10/2020 | Ivans | B64D 5/00 |
| 2021/0107652 A1* | 4/2021 | Velazquez | B64C 29/0033 |
| 2021/0107653 A1* | 4/2021 | Baharav | B64U 10/13 |
| 2021/0247781 A1* | 8/2021 | Liu | G05D 1/0088 |
| 2021/0309353 A1* | 10/2021 | Gil | B64U 10/25 |
| 2021/0399541 A1* | 12/2021 | Johansen | B64D 1/02 |
| 2022/0289375 A1* | 9/2022 | Schäfer | B64C 39/024 |
| 2022/0355929 A1* | 11/2022 | Gil | B64C 17/02 |
| 2023/0294849 A1* | 9/2023 | Crockford | B64U 60/40 |
| | | | 244/117 R |
| 2024/0101287 A1* | 3/2024 | Takahashi | B64U 80/86 |
| 2024/0101288 A1* | 3/2024 | Takahashi | B64U 70/92 |
| 2024/0109676 A1* | 4/2024 | Ruslanovich | B64D 1/22 |
| 2024/0199243 A1* | 6/2024 | Andreev | G05D 1/695 |
| 2024/0217678 A1* | 7/2024 | Andreev | B64U 20/40 |
| 2024/0228037 A1* | 7/2024 | Suzuki | B64U 10/60 |
| 2025/0074589 A1* | 3/2025 | Husband | B64D 25/08 |
| 2025/0289599 A1* | 9/2025 | Andreev | B64D 5/00 |
| 2026/0001644 A1* | 1/2026 | Suzuki | B64C 17/02 |
| 2026/0001647 A1* | 1/2026 | Yavilevich | B64D 5/00 |

* cited by examiner

1000

200

200

100

PAYLOAD (VARIANTS) AND AIR TRANSPORT SYSTEM (VARIANTS) COMPRISING SAME

CROSS REFERENCE TO RELATED APPLICATIONS

This application claims priority to Russian Patent Application No. RU2024107042 filed Mar. 18, 2024, the contents of which are hereby incorporated by reference in their entirety.

FIELD OF THE INVENTION

The present invention relates to transport equipment, in particular to vehicles capable of flying or performing movement through the air to deliver a user to a target location, specifically to payloads having an improved design and air transport systems comprising one of such payloads and unmanned aircraft apparatuses configured to dock to said payload.

BACKGROUND OF THE INVENTION

To date, there have been developed many various designs of a payload for transporting passengers and/or cargo of various types, as well as many various automated or semi-automated air transport systems based on the use of unmanned aircraft apparatuses (UAAs) configured to detachably dock to a payload for moving same through the air to a target location. However, despite the fact that modern payload designs and modern air transport systems intended to move said payload through the air using unmanned aircraft apparatuses docked to the housing of the payload make it possible to relatively quickly deliver or move a user through the air to a target location, they have a significant disadvantage of impossibility of non-stop movement of such payload through the air to a target location over a long period of time, i.e., without the need for landing the payload followed by maintenance and replenishment of the range of the unmanned aircraft apparatuses involved in moving said payload through the air.

Accordingly, in view of at least the above disadvantage of the state-of-the-art designs of a payload and of air transport systems based on the use of unmanned aircraft apparatuses for transporting payloads through the air, there is an urgent need for the development of improved designs of a payload and improved air transport systems.

In particular, U.S. patent application No. 2023294849 (US2023294849) published on Sep. 21, 2023 provides a payload comprising a housing provided with one or more docking mechanisms each configured to detachably toothedly interact with a toothed guide of a docked unmanned aircraft apparatus so to enable said docked unmanned aircraft apparatus to be moved with respect to the housing of the payload, and provides an air transport system which comprises the payload according to US 2023294849 and an unmanned aircraft apparatus docked to the housing of the payload.

Of note, the payload and air transport system disclosed in US2023294849 also do not overcome the above-stated disadvantage of impossibility of non-stop movement of such payload through the air to a target location over a long period of time.

Thus, there is an obvious need for further improvement of the designs of known payloads and improvement of air transport systems comprising such payload, in particular to increase the range of non-stop flight.

Accordingly, the main technical problem solved by the present invention is to create designs of a payload and air transport systems that would enable such payload to move through the air using unmanned aircraft apparatuses and which would at least partially overcome the above-mentioned disadvantage of the prior art of insufficient non-stop flight range.

A further technical problem solved by the present invention is to expand the range of vehicles capable of transporting or delivering a user/cargo through the air to a target location.

DISCLOSURE

The main object of the present invention is to create payloads and air transport systems that solve each at least the above technical problem of the prior art, as well as to expand the range of vehicles for transporting cargo/passengers through the air.

Another object of the present invention is to create alternative designs of a payload and alternative air transport systems comprising such payload with respect to the technical solutions known in the prior art.

Each of the tasks at hand is solved in the first aspect of the present invention due to the fact that the subject payload comprises: (i) a housing provided with one or more docking mechanisms, each of which is configured to detachably toothedly interact with a toothed guide of a docked unmanned aircraft apparatus so as to enable the movement of said docked unmanned aircraft apparatus with respect to the housing, at least one of the docking mechanisms is further configured to detachably toothedly interact with a toothed guide of yet another unmanned aircraft apparatus so as to enable the action of said yet another unmanned aircraft apparatus onto said docked unmanned aircraft apparatus for withdrawal of the latter from interaction with said at least one docking mechanism.

In one embodiment of the first aspect of the present invention, the housing of the payload may be provided with two air propulsion units provided on opposite sides of the housing, and the docking mechanisms may be installed on the housing of the payload so as to enable the placement of the air propulsion units of the housing of the payload and the air propulsion units of the unmanned aircraft apparatus docked to the housing of the payload in the same plane on different sides of the housing of the payload or with a predetermined angular offset along the perimeter of the housing of the payload while introduction of the toothed guide of the unmanned aircraft apparatus into toothed interaction with said docking mechanisms of the housing of the payload. The placement of the air propulsion units of the housing of the payload and the air propulsion units of the unmanned aircraft apparatus docked to the housing of the payload in the same plane on different sides of the housing of the payload or with a predetermined angular offset along the perimeter of the housing of the payload provides an additional technical result of increased stability of the housing of the payload in the air while docking of said unmanned aircraft apparatus to the housing of the payload, in particular due to the minimization of the mutual influence of air flows generated by the air propulsion units of the housing of the payload and the air propulsion units of the docked unmanned aircraft apparatus.

Furthermore, each of the tasks at hand is solved in the second aspect of the present invention due to the fact that in the subject air transport system comprising: (i) a payload provided with two or more docking mechanisms; and (ii) two or more unmanned aircraft apparatuses, each of which is provided with a toothed guide configured to enter into a detachable toothed interaction with at least one of said docking mechanisms of the payload so as to enable the movement of said docked unmanned aircraft apparatus with respect to the payload, wherein the housing of at least one of said unmanned aircraft apparatuses is configured to enable the housing of the other unmanned aircraft apparatus of said unmanned aircraft apparatuses to at least partially extend therethrough while the movement of said at least one unmanned aircraft apparatus or said other unmanned aircraft apparatus with respect to the payload.

Furthermore, each of the tasks at hand is solved in the third aspect of the present invention due to the fact that in the subject payload comprising: (i) a housing provided with one or more toothed guides, each of which is configured to detachably toothedly interact with a docking mechanism of an unmanned aircraft apparatus so as to enable the movement of said docked unmanned aircraft apparatus with respect to the housing along said toothed guide, wherein at least one of the toothed guides of the housing is further configured to detachably toothedly interact with the docking mechanism of yet another unmanned aircraft apparatus so as to enable the action of said yet another unmanned aircraft apparatus onto said docked unmanned aircraft apparatus for withdrawal of the latter from interaction with said at least one toothed guide.

Furthermore, each of the tasks at hand is solved in the fourth aspect of the present invention due to the fact that in the subject air transport system comprising: (i) a payload provided with two or more toothed guides; and (ii) two or more unmanned aircraft apparatuses, each of which is provided with a docking mechanism configured to enter into a detachable toothed interaction with at least one of said toothed guides of the payload so as to enable the movement of said docked unmanned aircraft apparatus with respect to the payload along said at least one toothed guide, wherein the housing of at least one of said unmanned aircraft apparatuses is configured to enable the housing of the other unmanned aircraft apparatus of said unmanned aircraft apparatuses to at least partially extend therethrough while the movement of said at least one unmanned aircraft apparatus or said other unmanned aircraft apparatus along the respective at least one toothed guide of the payload.

The above first, second, third and fourth aspects of the present invention provide each a technical result of increased versatility of the payload. Of note, the increased versatility of the payload is due to the capability to replace any unmanned aircraft apparatus detachably docked to the payload with other unmanned aircraft apparatus directly in the air, that is, without the need to land this payload to replenish the range of the unmanned aircraft apparatus to be replaced.

The above first, second, third and fourth aspects of the present invention provide each an additional technical result of increased duration or range of flight of the payload. Of note, the increased duration or range of flight of the payload is also due to the capability to replace any unmanned aircraft apparatus detachably docked to the payload with other unmanned aircraft apparatus directly in the air, that is, without the need to land this payload to replenish the range of the unmanned aircraft apparatus to be replaced.

The above first, second, third and fourth aspects of the present invention provide each yet another additional technical result of reduced consumption of energy resources necessary to carry out the replacement of any unmanned aircraft apparatus detachably docked to the payload with other unmanned aircraft apparatus. Of note, the reduced energy consumption required to carry out the replacement of one unmanned aircraft apparatus docked to the payload with other unmanned aircraft apparatus is due to the fact that said replacement process is carried out as a result of the action of the other unmanned aircraft apparatus to be docked to the payload onto the unmanned aircraft apparatus that was previously docked to the payload and which must be withdrawn from the interaction with the payload.

Furthermore, the above first, second, third and fourth aspects of the present invention provide each yet another additional technical result of increased safety of flight of the payload. Of note, the increased safety of flight of the payload is also due to the capability to replace any unmanned aircraft apparatus detachably docked to the payload with other unmanned aircraft apparatus directly in the air, that is, without the need to land this payload to replenish the range of the unmanned aircraft apparatus to be replaced.

Additional advantages of the claimed group of inventions and individual inventions in said group, including particular embodiments thereof described herein or characterized in dependent claims, will be appreciated by one skilled from the following detailed description of the present invention and the accompanying drawings, with reference to which various embodiments of the present invention are described in more detail below.

Furthermore, the above first, second, third and fourth aspects of the present invention provide each yet another additional technical result of expansion of the range of vehicles capable of moving or delivering the user/cargo through the air to a target location.

BRIEF DESCRIPTION OF DRAWINGS

The accompanying drawings which are included to provide further understanding of the principles of the present invention constitute a part hereof and are incorporated herein to illustrate the below embodiments and aspects of the present invention. The accompanying drawings, together with the description below, serve to explain the principles of the present invention. In the drawings.

DETAILED DESCRIPTION

Figure 1:
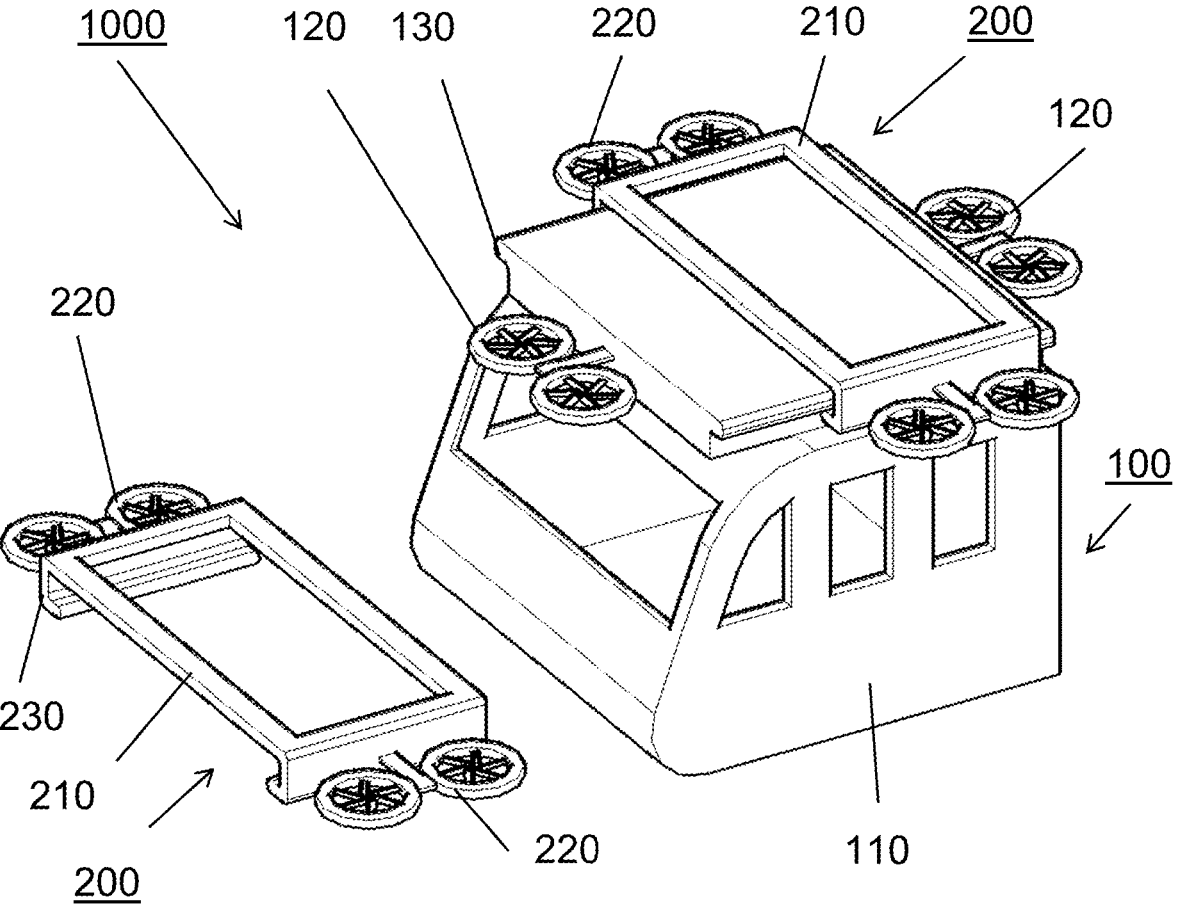
FIG. 1 shows one of the illustrative embodiments of the air transport system according to the present invention which is present in a state in which a replacing unmanned aircraft apparatus has flown up to the payload to replace an unmanned aircraft apparatus to be replaced previously detachably docked to the payload.

Hereinafter, various exemplary embodiments of the present invention are described with reference to the accompanying drawings; however, it should be understood that the description below does not define or limit the scope of the present invention.

In the following description, a detailed description of known functions and designs will be omitted as this unimportant information may obscure the concept of the present invention.

It is to be understood that in the following description the terms such as "first", "second", "upper", "lower", "lateral", "front", "rear", etc. are used solely for convenience, and they should not be interpreted as limiting terms. In particular, as used in the present invention, unless explicitly stated otherwise in the description herein, the terms "first", "second", "third" or the like are used to distinguish elements, components, parts, assemblies, modules, blocks, embodiments or the like, to which they pertain, from one another and not meant to describe any particular relationship therebetween.

References to an item in the singular should be understood to include such items in the plural, and vice versa, unless explicitly stated otherwise or clear from the context herein.

Grammatical conjunctions are intended to express any and all disjunctive and conjunctive combinations of conjoined clauses, sentences, words and the like, unless otherwise stated or clear from the context. Thus the term "or" should be understood to generally mean "and/or" and so forth.

Recitation of ranges of values herein is not intended to be limiting, referring instead individually to any and all values falling within the range, unless otherwise indicated herein, and each separate value within such a range is incorporated into the description as if it was individually recited herein.

Words "about," "approximately" or the like, when accompanying a numerical value, are to be construed as including any deviation as would be understood by one of ordinary skill in the art to operate satisfactorily for an intended purpose. Ranges of values and/or numeric values are provided herein as examples only, and do not constitute a limitation on the scope of the described embodiments.

Any and all examples provided herein or at least a portion thereof, as well as corresponding phrases ("for example", "such as", "in particular" or the like), are used merely to facilitate understanding of the principles of the present invention and to provide for sufficient disclosure of the present invention; however, these phrases do not pose any limitations on the embodiments of the present invention, for description of which embodiments they are utilized herein, in particular they do not limit practical implementations of elements, components, parts, assemblies, modules, blocks, devices, means and/or the like utilized to disclose the principles of design, functioning (exercising) and/or operation of the present invention.

Terms and Definitions Used in the Description
Herein

The term "illustrative" means a non-limiting example, instance or illustration. In a similar manner, the terms "for example" and "by way of example" used herein set off lists of one or more non-limiting examples, instances or illustrations. As used herein, circuitry is "configured" to perform a function whenever the circuitry comprises the necessary hardware and code (if any is necessary) to perform the function, regardless of whether performance of the function is blocked or forbidden (for example, by an operator-configurable setting, factory trim, etc.).

As used in the present invention, the term "correspondence" and derivatives thereof (i.e. adjective, verb, adverb) does not necessarily mean exact conformity or exact equality in/to/between whatsoever in any respect but may imply a departure or deviation from said equality within specified limits. For example, the term "corresponding coordinates", unless the description herein clearly dictates otherwise, means not only that these coordinates may be exactly equal to one another or may exactly coincide with one another but also implies that said equality or coincidence of coordinates may be established with some error (for example, with the error of operation of a GPS system) or within the bounds of a predetermined geographic region surrounding an exact geographic point or region to which these coordinates belong or an exact geographic location to which these coordinates belong.

As used in the present invention, the term "unmanned aircraft apparatus" (UAA), unless the description herein clearly dictates otherwise, refers to an unmanned aircraft apparatus which is configured to fly or which is capable of moving through the air in automatic mode, i.e. without involving a human or external control sources, or is capable of moving through the air in semi-automatic mode, i.e. with receipt of at least a portion of control commands from a human (for example, a pilot, an operator or the like) or an external source (for example, a control panel, control server, external control device or the like) via predetermined communication channels. Unlimited examples of UAAs are various multi-rotor UAAs, for example, multicopter drones; single-rotor UAAs, for example, unmanned helicopter; hybrid UAAs, for example, rotary wing drones; and the like.

In the context of the present invention, the term "housing", unless the description herein clearly dictates otherwise, refers to a framework, skeleton, shell, panelling, fuselage, load-bearing structure or housing of a physical inanimate object, each of which may be formed from a single load-bearing element or a combination of coupled to one another load-bearing elements, wherein the type, shape, overall dimensions, design features and/or material of such housing are not specifically limited in any way.

In the context of the present invention, the term "payload", unless the description herein clearly dictates otherwise, refers to people or living beings (in particular, to people or living beings as such or people or living beings placed into a capsule, cabin, accommodation module, cryo-module, rescue module, living compartment, living block and the like) or to cargo (to cargo as such or to cargo placed into crates, boxes, packages, bags, containers, reservoirs, vessels, tanks, canisters, receptacles, barrels, cisterns, cylinders, vessels, reservoirs, packs, bottles, flasks, glass containers, cylinders, cases, storage modules and the like) which may be accommodated in the housing of the means of transport performing the function of a carrier and intended for delivery, shipment or transportation of people, various living beings and/or various cargos through the air, over ground (land), over water and/or under water.

As used in the present invention, the term "module", unless the description herein clearly dictates otherwise, refers to a functional element or a combination of functional elements of a device in the form of a part, node, block or other assembly unit that performs certain technical functions that provide for the functioning of the device. The module generally may be implemented in practice using a combination of known structural elements, a combination of known structural elements and known hardware, a combination of known structural elements and known software and hardware or a combination of known hardware and known software. Accordingly, for example, the control device may be implemented using hardware and software. As used in the present invention, the control device may be a physical device, an apparatus, or a plurality of modules implemented using hardware, for example, using an application-specific integrated circuit (ASIC) or a field-programmable gate array (FPGA), or a combination of hardware and software, for example, using a microprocessor system and a set of instructions implementing the functionality of the control device, which (when executed) transform the microprocessor system into an application-specific device or system (for example, automatic pilot system). Furthermore, each of the modules described herein or at least one of them may be implemented in the form of a combination of hardware and software, wherein some of the functionality described herein with respect to one of the modules may be implemented by means of hardware only, whereas other functionality described herein with respect to the same module or other module may be implemented by way of using hardware in combination with software. Furthermore, in the context of the present invention, the docking module 130 may be configured to detachably interact with at least one unmanned aircraft apparatus, wherein the docking module 130 may be implemented using a combination of known structural elements, a combination of known structural elements and hardware, a combination of structural elements and software and hardware or a combination of hardware and software.

As used in the present invention, the term "navigation command", unless the description herein clearly dictates otherwise, refers to an instruction directed to aircraft apparatuses being part of the payload 100. Navigation commands may be presented or provided by the movement control system of the aircraft apparatuses in the form of digital or analog data, instructions, control signals or the like. Navigation commands may be initially generated by, without limitation, an automatic operator, an operator (whether locally or remotely situated) and/or an obstacle-avoidance system. In particular, navigation commands may be received, for example, by a control unit for controlling an aircraft apparatus being part of one of the unmanned aircraft apparatuses in the system for moving a payload.

As used in the present invention, the term "manual control", unless the description herein clearly dictates otherwise, refers not only to control solely using human hands but also using human feet, fingers, voice, pupils or any suitable combination thereof. Thus, as used in the present invention, the term "manual control" refers to at least one of the following: buttons, levers, joysticks, toggle switches, pedals, touch screen, gesture control sensors, pupil-tracking scanners, microphone and/or the like.

As used in the present invention, the term "charging device", unless the description herein clearly dictates otherwise, refers to a device for replenishing the range of an aircraft apparatus by way of recharging the rechargeable battery thereof and/or by replenishing the fuel capacity thereof.

As used in the present invention, the term "database", unless the description herein clearly dictates otherwise, refers to any structured data set that does not depend on a specific structure, database management software, hardware of the computer that stores data, uses data or otherwise makes data available for use. The database may be present on the same hardware running the process that stores or uses the information stored in the database or it may be present on separate hardware, for example, a dedicated server or on a plurality of servers.

As used in the present invention, the term "parking station", unless the description herein clearly dictates otherwise, means an unmovable or movable structure adapted to accommodate aircraft apparatuses, store aircraft apparatuses and/or replenish the range (for example, recharge) of vehicles therein.

As used in the present invention, the term "control device" refers to computing equipment executing a computer program for enabling receipt of requests (for example, from other computing devices) over a communication network, execution or processing of such requests and/or transmission of such requests over a communication network (for example, to other computing devices). The computing equipment executing a computer program may be, without limitation, a single physical computer or a single physical computer system. As used in the present invention, the use of the term "control device" does not mean that each computational task (for example, received instructions or commands) or any other specific task will be received, executed or cause performance by one and the same control device (i.e. by one and the same software and/or hardware), which means that any quantity of pieces of software or hardware may be involved in receiving/transmitting, executing or may cause performance of any task or request or the consequences of any task or request, where all that software and hardware may be implemented in the form of one or more control devices.

As used in the present invention, the term "server" refers to computing equipment executing a computer program for enabling receipt of requests (for example, from other computing devices) over a communication network, execution or processing of such requests and/or transmission of such requests over a communication network (for example, to other computing devices). The computing equipment executing a computer program may be, without limitation, a single physical computer or a single physical computer system. As used in the present invention, the use of the term "server" does not mean that each computational task (for example, received instructions or commands) or any other specific task will be received, executed or cause performance by one and the same server (i.e. one and the same software and/or hardware), which means that any quantity of pieces of software or hardware may be involved in receiving/transmitting, executing or may cause performance of any task or request or the consequences of any task or request, where all that software and hardware may be implemented in the form of one or more servers.

Air Transport System

FIG. 1 shows one of the illustrative embodiments of an air transport system 1000 according to the present invention comprising a payload 100 according to the present invention comprising a housing 110 for the user, which housing has the form of a cabin and which is configured to accommodate therein or thereon the user, and two unmanned aircraft apparatuses 200 each of which is configured to enter into a detachable interaction with, to detachably couple or to detachably dock to the housing 110 so as to enable the housing 110 to be moved through the air and, accordingly, the payload 100 itself.

Of note, the unmanned aircraft apparatuses 200 detachably coupled to the housing 110 of the payload form a functional group of aircraft apparatuses enabling the housing 110 of the payload to be moved through the air under the control of a control device being part of the payload 100, wherein the control device of the payload 100 may be installed in or on the housing 110 of the payload.

In one of the embodiments of the present invention, to the housing 110 of the payload on the exterior thereof there may be simultaneously and detachably docked one or more unmanned aircraft apparatuses 200 (for example, one, two, three, four, five, six, seven, eight, nine, ten or more unmanned aircraft apparatuses 200 depending on the target carrying capacity of the payload 100 and the dimensions of its housing 110) that are part of the air transport system 1000, wherein said docked unmanned aircraft apparatuses 200 may be disposed on the same side of the housing 110 of the payload or on different sides of the housing 110 of the payload. In one of the variations of this embodiment of the present invention, in which to the housing 110 of the payload there may be docked two or more unmanned aircraft apparatuses 200, at least two or a portion of said aircraft apparatuses 200 may form a functional group of aircraft apparatuses, wherein the aircraft apparatuses 200 being part thereof operate under the control of the control device of the payload 100 so as to enable the payload 100 to be moved through the air. In another variation of this embodiment of the present invention, in which to the housing 110 of the payload there may be docked two or more unmanned aircraft apparatuses 200, each of which may operate under the control of own control device thereof being part of said unmanned aircraft apparatus 200.

In another embodiment of the present invention, the housing 110 of the payload may be pre-provided with one or more unmanned aircraft apparatuses, which may be rigidly or undetachably coupled to the housing 110 of the payload (for example, using welding, soldering or fasteners known from the prior art) and which may also be part of the air transport system 1000, wherein at least one or each of said aircraft apparatuses pre-coupled to the housing 110 may be generally configured analogously to the aircraft apparatus 200 or may be the aircraft apparatus 200. In one of the variations of this embodiment of the present invention, to the housing 110 of the payload there may be docked one or more unmanned aircraft apparatuses 200, wherein said docked aircraft apparatuses 200 and the aircraft apparatuses pre-coupled to the housing 110 may form one or more cluster aircraft apparatuses, operating each under the control of the control device of the payload 100, or may operate each independently of one another under the control of own integrated control device. In another variation of this embodiment of the present invention, one or more unmanned aircraft apparatuses 200 may be docked to at least one of the unmanned aircraft apparatuses pre-coupled to the housing 110 so as to form a cluster aircraft apparatus operating under the control of the control device of the payload 100. In yet another variation of this embodiment of the present invention, one or more unmanned aircraft apparatuses 200 may be detachably pre-docked to the housing 110 of the payload, wherein to at least one of said pre-docked unmanned aircraft apparatuses 200 there may be further docked at least one additional unmanned aircraft apparatus 200 to form a cluster aircraft apparatus operating under the control of the control device of the payload 100.

In yet another embodiment of the present invention, at least one or each of the unmanned aircraft apparatuses 200 which may be docked to the housing 110 of the payload and which are part of the air transport system 1000 may be a cluster unmanned aircraft apparatus formed or composed of two or more aircraft apparatuses which are docked or coupled to one another, wherein each such cluster aircraft apparatus may comprise aircraft apparatuses of the same type or of different types. In one of the variations of this embodiment of the present invention, at least one or each of the unmanned aircraft apparatuses 200 which may be docked to the housing 110 of the payload may be configured in the form of two or more docked or coupled to one another cluster aircraft apparatuses, wherein each such cluster aircraft apparatus may be formed from two or more docked or coupled to one another aircraft apparatuses having the same type or different types, wherein the types of aircraft apparatuses, of which the distinct cluster aircraft apparatuses are comprised, may (fully or at least partially) coincide with one another or may (fully or at least partially) differ from one another.

Of note, in the embodiments of the present invention described herein, the type, shape, geometric dimensions, materials of manufacture of any of the unmanned aircraft apparatuses 200 which are part of the air transport system 1000 and which must be docked to the housing 110 of the payload are not specifically limited in any manner.

Each of the unmanned aircraft apparatuses 200 which are part of the air transport system 1000 and which are to be docked to the housing 110 of the payload may be implemented in the form of any suitable unmanned aircraft apparatus (UAA) known from the prior art and configured to take off into the air, move through the air (fly) and land in automatic mode (i.e. in autopilot mode that does not involve any participation of a human subject in the process of controlling the operation of the aircraft apparatus and/or that does not involve the receipt, by the aircraft apparatus, of any control or navigation commands from one or more external control sources), or in semi-automatic mode (i.e. in a mode that enables the use of autopilot, and also enables the participation of a human subject in the process of controlling the operation of the aircraft apparatus and/or enables the receipt, by the aircraft apparatus, of any control or navigation commands from one or more external control sources). Of note, in the case of operation in semi-automatic mode, any one of the unmanned aircraft apparatuses 200 which are to be docked to the housing 110 of the payload may receive at least a portion of control commands from a human subject, for example, from a pilot, operator, or the like, or from an external control source, for example, a control panel, a control server, an external control device, or the like) via predetermined communication channels. In particular, non-limiting examples of such UAAs, in the form of one of which any one of the unmanned aircraft apparatuses 200 may be configured, are various multi-rotor UAAs (for example, multicopter drones), single-rotor UAAs (for example, unmanned helicopters), hybrid UAAs (for example, rotary wing drones), and the like.

As shown in FIG. 1, one of the two unmanned aircraft apparatuses 200 being part of the air transport system 1000 is docked to the housing 110 of the payload, and the other aircraft apparatus 200 of the two aircraft apparatuses 200 is present in the air in a region of space corresponding to the payload 100 and is ready to dock to the housing 110 of the payload.

According to one embodiment of the present invention, the unmanned aircraft apparatus 200 being present in the air in a region of space corresponding to the payload 100 and being ready to dock to the housing 110 of the payload may be further detachably or undetachably docked to another aircraft apparatus 200 previously docked to the housing 110 of the payload in the process of docking to the housing 110 of the payload to form a cluster unmanned aircraft apparatus, wherein both unmanned aircraft apparatuses 200 forming said cluster unmanned aircraft apparatus turn out to be detachably docked to the housing 110 of the payload so as to enable the payload 100 to move through the air under the control of the control device of the payload 100, the control device of at least one of said unmanned aircraft apparatuses 200 docked to the housing 110 of the payload, or external control device.

As shown in FIG. 1, each of the unmanned aircraft apparatuses 200 comprises a fuselage or housing 210 of any suitable type provided with two air propulsion units 220, each of which is detachably or undetachably installed on one of two opposite sides of the housing 210 and each of which includes one or more air propellers (for example, one, two, three, four, five, six, seven, eight, nine, ten or more air propellers, which or at least a portion of which are installed in the same plane, in different planes or in parallel planes). FIG. 1-6 shows an embodiment according to which each of the air propulsion units 220 of the unmanned aircraft apparatus 200 comprises two air propellers to form the unmanned aircraft apparatus 200 in the form of a quadcopter. Further, in other embodiments, the air propulsion units 220 may comprise a different number of air propellers, such as one, three, four, five, six, seven or more, to form the unmanned aircraft apparatus 200 in the form of a multicopter. The unmanned aircraft apparatus 200 in some embodiments may also include more than two air propulsion units 220, each of which may comprise one or more air propellers. For example, the unmanned aircraft apparatus 200 may comprise four air propellers 220, each comprising one propeller to form a system analogous to the illustrative example shown in FIG. 1-6. The number of air propulsion units 220 in certain embodiments may be two or more (for example, two, three, four, five, six, seven, eight, nine, ten or more air propulsion units 220), each of which comprises one or more air propellers (for example, one, two, three, four, five, six, seven, eight, nine, ten or more air propellers, which or at least some of which are installed in the same plane, in different planes or in parallel planes). Of note, the housing 210 in each of the unmanned aircraft apparatuses 200 being part of the air transport system 1000 has the form of a frame or framework whose structural elements are coupled to one another to form a cavity or hollow space between the shortened walls of the housing 210, the walls being provided with air propellers 220. Furthermore, each of the unmanned aircraft apparatuses 200 detachably coupled to the housing 110 of the payload comprises a control device configured to control the operation of such unmanned aircraft apparatus 200. In particular, the control device in each of the unmanned aircraft apparatuses is communicatively coupled to the air propulsion units 220 so as to enable the control of operation thereof, in particular to enable the control of the operation of the air propellers (in particular to enable the switching-on, switching-off or altering of the operating characteristics of the air propellers, such as, for example, the speed of rotation or the direction of rotation) included in each of said air propulsion units 220, thus enabling flight or movement through the air of said unmanned aircraft apparatus 200. Of note, the control device in each of the unmanned aircraft apparatuses 200 detachably coupled to the housing 110 of the payload may control the operation of said unmanned aircraft apparatus 200, including the operation of the air propulsion units 220 thereof, in response to control instructions of the control device of the payload 100 or an external control device (for example, a control server for controlling the operation of the aircraft apparatuses).

Of note, each of the unmanned aircraft apparatuses 200 being part of the air transport system 1000 is configured to undock or disconnect from the housing 110 of the payload in response to control instructions received by the control device of said unmanned aircraft apparatus 200 from the control device of the payload 100 or an external control device.

As shown in FIG. 1, the housing 210 in each of the unmanned aircraft apparatuses 200 being part of the air transport system 1000 may be provided with one or more air propulsion units 220 (for example, one, two, three, four, five, six, seven, eight, nine, ten or more air propulsion units 220) detachably coupled to the housing 210 (i.e. with the possibility of detachment from the housing 210) or rigidly coupled to the housing 210 (i.e. without the possibility of detachment from the housing 210) so as to enable, upon actuation thereof, the flight or movement through the air of said unmanned aircraft apparatus 200, wherein each of said air propulsion units 220 may be installed on one of the sides of the housing 210 (for example, on the side of the upper portion of the housing 210, on the side of the lower portion of the housing 210 or on one of the sides of the housing 210). Of note, in this embodiment of the present invention, at least one or each of the air propulsion units 220 may include one or more air propellers, which or at least a portion of which may be actuated so as to enable the rotation thereof in the same direction of rotation or in different directions of rotation and/or enable the rotation thereof at the same speed of rotation or at different speeds of rotation. In one of the variations of this embodiment of the present invention, in at least one or each of the unmanned aircraft apparatuses 200, all or at least a portion of the air propulsion units 220 may be installed on the same side of the housing 210 or on distinct sides of the housing 210 so as to enable, upon actuation of all such air propulsion units 220 or at least a portion of same, the flight or movement through the air of said unmanned aircraft apparatus 200 along a predetermined trajectory of movement or in a predetermined direction.

In another embodiment of the present invention, the housing 210 in at least one or each of the unmanned aircraft apparatuses 200 being part of the air transport system 1000 may be provided with two or more air propulsion units 220 which may be detachably or rigidly installed on one of the sides of the housing 210 immediately adjacent to one another or at a predetermined distance from one another and each of which may comprise one or more air propellers (for example, one, two, three, four, five, six, seven, eight, nine, ten or more air propellers), thus enabling, upon actuation of all or only at least a portion of the air propellers in at least one or each of said air propulsion units 220, the flight or movement through the air of said unmanned aircraft apparatus 200.

In some embodiments of the present invention, the housing 210 in at least one or each of the unmanned aircraft apparatuses 200 being part of the air transport system 1000 may be provided with one or more air propulsion units 220, at least one or each of which may be fully or at least partially installed in the housing 210 so as to extend, unfold or deploy therefrom under the control of the control device of said unmanned aircraft apparatus 200, including in response to control commands of the control device of the payload 100 or an external control device.

The control device included in each of the unmanned aircraft apparatuses 200 being part of the air transport system 1000 may be installed interiorly or exteriorly to the housing 210 so as to enable the control of the operation of said unmanned aircraft apparatus 200, including the operation of the air propellers in the air propulsion units 220 which are provided to the housing 210. Thus, the control device of the aircraft 200 is configured to present control commands to at least one or each of the air propulsion units 220 so as to enable actuation thereof, thus enabling the flight or movement of said unmanned aircraft apparatus 200 through the air. Of note, the simultaneous operation of all or at least most of air propulsion units 220 in at least one or each of the air propulsion units 220 with which the housing 210 is provided in at least one or each of the unmanned aircraft apparatuses 200 being part of the air transport system 1000 increases the carrying capacity of said unmanned aircraft apparatus 200 and, accordingly, the payload 100 in general. In one of the embodiments of the present invention, all or at least a portion of the air propulsion units 220 in at least one or each of the unmanned aircraft apparatuses 200 being part of the air transport system 1000 may be actuated sequentially or substantially simultaneously using the control device of said unmanned aircraft apparatus 200. In another embodiment of the present invention, all or at least a portion of air propellers in at least one or each of the air propulsion units 220, which are provided to the housing 210 in at least one or each of the unmanned aircraft apparatuses 200 being part of the air transport system 1000, may be actuated by means of the control device of said unmanned aircraft apparatus 200 so as to enable the rotation thereof in the same direction or in different directions. In yet another embodiment of the present invention, at least one or each of the air propulsion units 220, which are provided to the housing 210 in at least one or each of the unmanned aircraft apparatuses 200 being part of the air transport system 1000, may be configured to rotate around the axis thereof by a predetermined angle under the control of the control device of said unmanned aircraft apparatus 200 or to displace with respect to the housing 210 of said unmanned aircraft apparatus 200.

According to another embodiment of the present invention, the control device of at least one of the unmanned aircraft apparatuses 200 being part of the air transport system 1000 may perform the functions of the control device of the payload 100, i.e. said control device of the aircraft 200 may be a control module of the payload 100, which control module presents control commands to the functional components of the payload 100. In one variation of this embodiment of the present invention, the control functions of the control device of the payload 100 may be distributed between the control devices of the aircraft apparatuses 200 being part of the air transport system 1000, such that said control devices of the aircraft apparatuses 200, which control devices are used in combination or in conjunction with one another, may form the control device of the payload 100.

Furthermore, each of the unmanned aircraft apparatuses 200 being part of the air transport system 1000 shown in FIG. 1 comprises at least one of the following means of wireless communication: an SW band radio antenna, USW radio antenna, UHF radio antenna, an optical communication module, half-duplex/simplex satellite communication module, 2G/3G/4G/LTE/5G cellular communication module, wireless communication module, wired communication module and the like, thus allowing each of the unmanned aircraft apparatuses 200 to receive navigation commands and/or control commands from the control device of the payload 100 and, accordingly, allowing the control device of the payload 100 to control the operation of said unmanned aircraft apparatus 200. Of note, navigation commands and/or control commands being received by any of the unmanned aircraft apparatuses 200 from the control device of the payload 100 using the wireless communication means of said unmanned aircraft apparatus 200 are transferred from said wireless communication means of the aircraft apparatus 200 to the control device of the aircraft apparatus 200 for processing same by this control device of the aircraft apparatus 200.

In some embodiments of the present invention, at least one or each of the unmanned aircraft apparatuses 200 being part of the air transport system 1000 may be operably coupled to the control device of the payload 100 in a wired manner so as to enable exchange of data with one another.

In turn, the control device of the payload 100 as part of the air transport system 1000 shown in FIG. 1 is configured to receive and process data (including system requests) from each of the unmanned aircraft apparatuses 200, and is also configured to generate control instructions/commands and/or to generate navigation instructions/commands based on said received data and the results of processing thereof so as to enable such generated control commands and/or navigation commands to be issued or sent to at least one or each of said aircraft apparatuses 200, including in response to a request from said unmanned aircraft apparatus 200. For issuing navigation commands and/or control commands to at least one or each of the unmanned aircraft apparatuses 200 being part of the air transport system 1000, the control device of the payload 100 is communicatively coupled, via a wireless communication network (not shown), to said aircraft apparatus 200.

The control device in at least one or each of the unmanned aircraft apparatuses 200 being part of the air transport system 1000 shown in FIG. 1 is communicatively coupled to the above wireless communication means of said unmanned aircraft apparatus 200, thus allowing said control device of the aircraft apparatus 200 to process navigation commands and/or control commands received by the wireless communication means of the aircraft apparatus 200 from the control device of the payload 100 upon establishing a wireless communication channel therebetween, and allowing the operation of the aircraft apparatus 200 to be controlled depending on said navigation commands and/or control commands. In particular, in response to navigation commands and/or control commands from the control device of the payload 100, the control device of the aircraft apparatus 200 may enable, for example, the performance of at least one of the following operations: (i) altering the flight speed of the aircraft apparatus 200, (ii) altering the flight direction of the aircraft apparatus 200, (iii) directing the aircraft apparatus 200 from a parking station (not shown) or a current airspace region to a target airspace region in which it is contemplated to detachably dock or couple the aircraft apparatus 200 to the housing 110 of the payload; (iv) performing docking or coupling of the unmanned aircraft apparatus 200 to the housing 110 of the payload; (v) performing undocking or uncoupling of the unmanned aircraft apparatus 200 from the housing 110 of the payload; (vi) moving the unmanned aircraft apparatus 200 with respect to or along the housing 110 of the payload, and (vii) directing the unmanned aircraft apparatus 200 to one of the parking stations (not shown) for placement therein or thereon so as to enable storage of said unmanned aircraft apparatus 200 in said parking station and/or enable replenishment of the range (charging) of said unmanned aircraft apparatus 200.

In various embodiments of the present invention, the control device (not shown) may not be part of the payload 100. In such embodiments of the present invention, the control device of the payload 100, which presents control commands and/or navigation commands to the control device of at least one or each of the unmanned aircraft apparatuses 200, may be a single server which may be configured in the form of, for example, the Dell Power-Edge™ server on which there may be used the Ubuntu Server or Windows Server operating system. In various other embodiments of the present invention, the functions of the control device of the payload 100 may be shared among multiple remote computer devices or computing devices, for example, may be implemented using multiple servers coupled to one another via the communication network so as to mutually exchange data therebetween.

In some embodiments of the present invention, the communication protocols and/or technical means used for data transfer or data exchange between the control device of the payload 100 and the aircraft apparatuses 200, may be at least partially different from one another and/or may at least partially coincide with one another. Furthermore, for data transfer or data exchange between the control device of the payload 100 and each aircraft apparatus 200 there may be simultaneously used one or more standard communication protocols and respective standard technical means of communication.

In certain embodiments of the present invention, the control device of the payload 100 may be configured to organize safety during flight or movement through the air of at least one or each of the unmanned aircraft apparatuses 200 which are to be docked or coupled to the housing 110 of the payload or which are undocked or uncoupled from the housing 110. In one of the variations of such embodiments of the present invention, the control device of the payload 100 may be further configured to organize safety during the flight or movement through the air of the payload 100 using aircraft apparatuses 200 docked or coupled to the housing 110 of the payload.

Furthermore, the control device of the payload 100 may have or may acquire access to at least one remote or external database (not shown) via the communication network or in other (wired or wireless) manner, or may have or acquire access to at least one local database stored on a storage device (not shown), which may be installed into the housing 110, or in the memory (not shown) which may be part of such control device of the payload 100.

In some embodiments of the present invention, the control device of the payload 100 may be any other suitable hardware, application software, system software or any combination thereof.

The communication network to which there may be communicatively coupled the control devices of the aircraft apparatuses 200 and the control device of the payload 100 also allows the control device of the payload 100 and the control devices of the aircraft apparatuses 200 to exchange between one another the system data and/or operational data which they use for implementing functions thereof or functional capabilities thereof described herein. Of note, the communication network also allows the control devices of the aircraft apparatuses 200 to exchange between one another the system data and/or operational data which they may also use for implementing functions thereof or functional capabilities thereof described herein. The communication network may be, for example, any suitable wireless communication link known from the prior art, such as a Wi-Fi wireless technology-based communication link, 2G, 3G, 4G or 5G wireless technology-based communication link, LTE technology-based communication link and/or the like.

In one of the embodiments of the present invention, the air transport system 1000 may comprise two or more wireless communication networks configured each analogously to the above communication network and used to perform mutual data exchange between the control devices of the aircraft apparatuses 200, the control device of the payload 100, any other functional devices which may be part of the air transport system 1000, and/or any functional components that may be part of the payload 100 or part of any one of said aircraft apparatuses 200, in real-time mode or in real time.

Each of the unmanned aircraft apparatuses 200 being part of the air transport system 1000 comprises an (embedded) integrated power supply source (not shown) configured in the form of a battery, one or more rechargeable batteries, an internal combustion engine generator, a hydrogen engine generator, a generator based on one or more solar panels, or a generator based on any other suitable energy source known from the prior art, wherein said integrated power supply source may also be configured to be charged from an external power supply source (not shown) using a charging device (not shown) of a suitable type coupled to said external power supply source and configured to connect thereto said integrated power supply source. In particular, the integrated power supply source in each aircraft apparatus 200 is coupled, by means of the power supply circuit of the aircraft apparatus 200, to the control device of the aircraft apparatus 200 and any other functional components of the aircraft apparatus 200 described herein so as to enable supply of power thereto or enable powering thereof.

In another embodiment of the present invention, the integrated power supply source in at least one or each of the unmanned aircraft apparatuses 200 being part of the air transport system 1000 may be charged in a wireless manner using an external charging device (not shown) whose operation is based on the principle of electromagnetic induction which will be appreciated by one skilled in art.

According to one embodiment of the present invention, the control device of at least one or each of the unmanned aircraft apparatuses 200 being part of the air transport system 1000 may further enable said unmanned aircraft apparatus 200 to be directed to a parking station (not shown). Such parking station may be provided with one or more charging devices (not shown) electrically coupled each to at least one of the power supply sources of the parking station and enabling each the coupling of the aircraft apparatus 200 thereto for at least partial charging or for at least partial replenishment of the range of said coupled aircraft apparatus 200 such that said aircraft apparatus 200 may switch to a state with at least a partially replenished range or fully replenished range, thus allowing for it to be detachably re-docked or re-coupled to the housing 110 of the payload.

Of note, in embodiments of the present invention, wherein the unmanned aircraft apparatus 200 may be coupled to one or more charging devices of the parking station to charge same or replenish the range thereof, each of the power supply sources of the parking station in this embodiment of the present invention may be one or more rechargeable batteries, an internal combustion engine generator, a hydrogen engine generator, a solar panel and any other suitable energy source known from the prior art. It should also be noted that at least one or each of the charging devices (not shown) of the parking station in such embodiments of the present invention may be a wireless charging device, a wired charging device or a charging dock. Alternatively, at least one or each of the charging devices of the parking station may be configured, for example, in the form of a device for supplying electrical energy, a device for supplying liquid or gaseous fuel and/or the like. As yet another alternative, at least one or each of the charging devices of the parking station may be hydraulically coupled to a pump (not shown) coupled by a hydraulic line to a reservoir or container (not shown) with fuel in a manner to enable intake of fuel from said container so as to enable supply of said intaken volume of fuel to the fuel tank of the aircraft apparatus 200 which fuel tank is hydraulically coupled to the fuel-powered engine of the aircraft apparatus 200, thus allowing to replenish the range of the aircraft apparatus 200 (in particular, due to at least partial replenishment of fuel volume in the fuel tank of the aircraft apparatus 200).

In one of the embodiments of the present invention, the control device of at least one or each of the unmanned aircraft apparatuses 200 being part of the air transport system 1000 may further enable detachable docking or detachable coupling of said unmanned aircraft apparatus 200 with a replenished range to the housing 110 of the payload in substitution for at least one of the unmanned aircraft apparatuses 200 with an insufficient range or with a range below a predetermined threshold value, which are detachably coupled to the housing 110 of the payload, or further to said aircraft apparatuses 200 with an insufficient range or with a range below a predetermined threshold value, wherein the payload 100, during said docking process, may be present in the air or on the surface of the ground (or the surface of another object which in turn may be present on the ground, on the surface of water and/or in the air). In one of the variations of this embodiment of the present invention, the process of docking or of detachable coupling itself of the unmanned aircraft apparatus 200 with a replenished range to the housing 110 of the payload may be controlled by the control device of the payload 100 which control device presents control commands and/or navigation commands to the control device of said unmanned aircraft apparatus 200.

In yet another embodiment of the present invention, while docking or coupling the aircraft apparatus 200 to the housing 110 of the payload, the power supply circuit of the coupled aircraft apparatus 200 may be further electrically coupled to the power supply circuit of the payload 100 to form a single power supply circuit (for example, using a connecting power cable which may be laid interiorly to the housing 110 of the payload or exteriorly to the housing 110 of the payload and which may be coupled to the power supply circuit of the aircraft apparatus 200 provided in the housing 210) and a cluster power source (for example, such cluster power source may be formed from the batteries of the aircraft apparatus 200 and the batteries of the payload 100 which are disposed in the housing 110 of the payload) which supplies power or powers all of the functional components of the aircraft apparatus 200 and the payload 100 substantially simultaneously, such that charging one of the individual power sources in such a cluster power source from an external power source (not shown) using a charging device (not shown) of a suitable type makes it possible to speak about charging the entire cluster power source. Of note, in such embodiment of the present invention, the range of one or more unmanned aircraft apparatuses 200 coupled to the housing 110 of the payload may be generally controlled by the control device of at least one of said aircraft apparatuses 200 or by the control device of the payload 100 by way of monitoring the state of the cluster power source (for example, by monitoring the residual charge of the cluster battery). In one of the variations of such embodiment of the present invention, the cluster power supply source may be recharged from two or more external power supply sources (not shown) using two or more charging devices (not shown) of a suitable type which may be electrically coupled each to the respective one of said external power supply sources and each of which may be configured to enable one or more of the power supply sources being part of said cluster power supply source to be coupled thereto such that such cluster power supply source may substantially be recharged by way of parallelly recharging the individual power supply sources thereof.

As shown in FIG. 1-4, in order to enable the creation of a detachable coupling between the housing 110 of the payload and the unmanned aircraft apparatus 200 being part of the air transport system 1000, the housing 210 of the aircraft apparatus is provided with toothed guides 230, and the payload 100 is provided with a docking module 130 with docking mechanisms 140, each configured to enter into a detachable toothed interaction with one of the toothed guides 230 while docking of said unmanned aircraft apparatus 200 to the payload 100.

In particular, as shown in FIG. 1-4, the housing 210 in each of the unmanned aircraft apparatuses 200 being part of the air transport system 1000 is provided with two rectilinear toothed guides 230 configured integral with the housing 210 at a predetermined distance from one another, wherein said toothed guides 230 are disposed or extend generally parallel to one another and are provided each with a row of teeth, wherein the teeth 240 are configured to enter into a detachable toothed interaction with at least one of the docking mechanisms 140 while docking of said unmanned aircraft apparatus 200 to the docking module 130. Of note, the spatial extent or length of each of the rectilinear toothed guides 230 is generally equal to the spatial extent or length of each of the two opposite shortened sides of the housing 210, i.e. each of the toothed guides 230 extends substantially along the entire shortened side of the housing 210 corresponding to said toothed guide 230. In one of the embodiments of the present invention, the spatial extent or length of each of the rectilinear toothed guides 230 may be equal to the spatial extent of the respective one of the two opposite shortened sides of the housing 210, may be equal to a portion of the spatial extent of each of the two opposite shortened sides of the housing 210, may be equal to a portion of the spatial extent of the respective one of the two opposite shortened sides of the housing 210, may be less than the spatial extent of the respective one of the two opposite shortened sides of the housing 210, or may be less than the spatial extent of each of the two opposite shortened sides of the housing 210.

Figure 2:
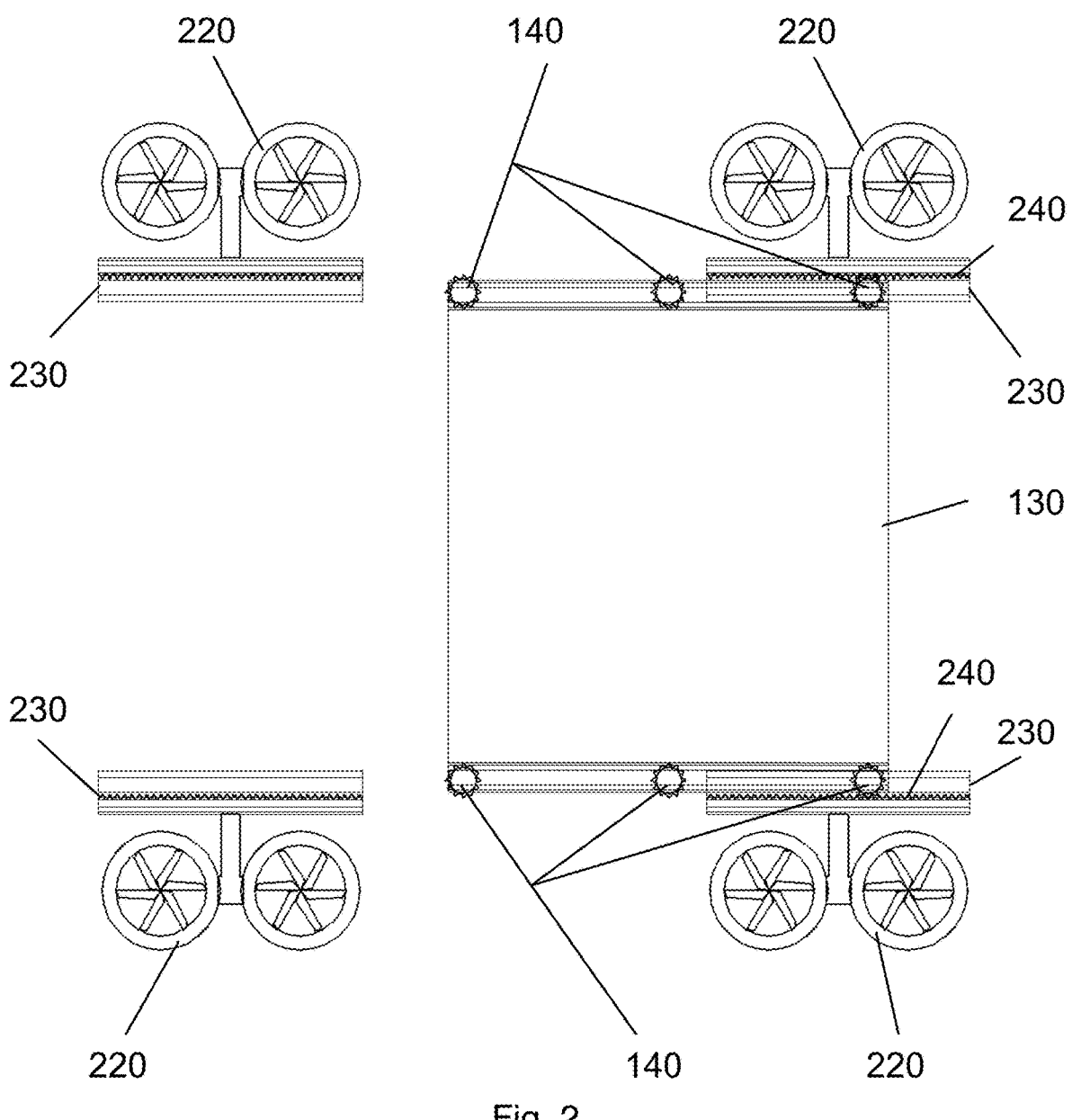
FIG. 2 shows a top view in section illustrating the main structural elements of the payload and of the unmanned aircraft apparatus which are involved in the process of docking this unmanned aircraft apparatus to this payload.
Figures 3, 4:
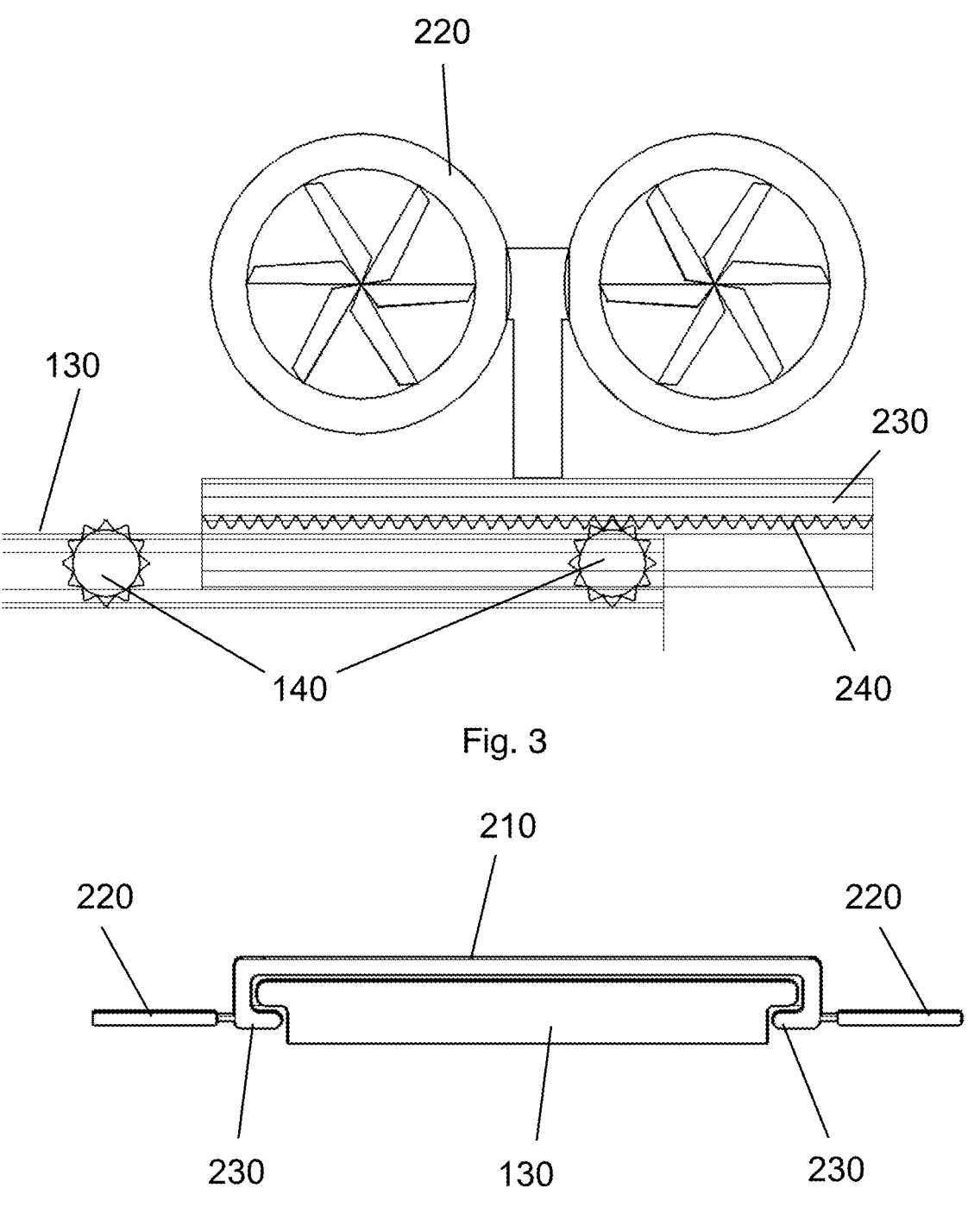
FIG. 3 shows an enlarged top view in section illustrating the main structural elements of the payload and of the unmanned aircraft apparatus which are involved in the process of docking this unmanned aircraft apparatus to this payload on only one side of the housing of the payload.
FIG. 4 is an end view illustrating the unmanned aircraft apparatus docked to the docking module of the payload.

Furthermore, as shown in FIGS. 2-3, the docking module 130, which is provided to the housing 110 in the payload 100 being part of the air transport system 1000, is provided with two rows of docking mechanisms, each comprising three toothed docking mechanisms 140 disposed at an equal or same distance from one another and configured to enter into a detachable toothed interaction with at least one of the teeth 240 provided on the respective one of the toothed guides 230 which are provided to the housing 210 of the aircraft apparatus while docking of the unmanned aircraft apparatus 200 to the docking module 130, wherein each of said two rows of docking mechanisms is installed on the respective one of two opposite elongated sides of the docking module 130.

Figure 5:
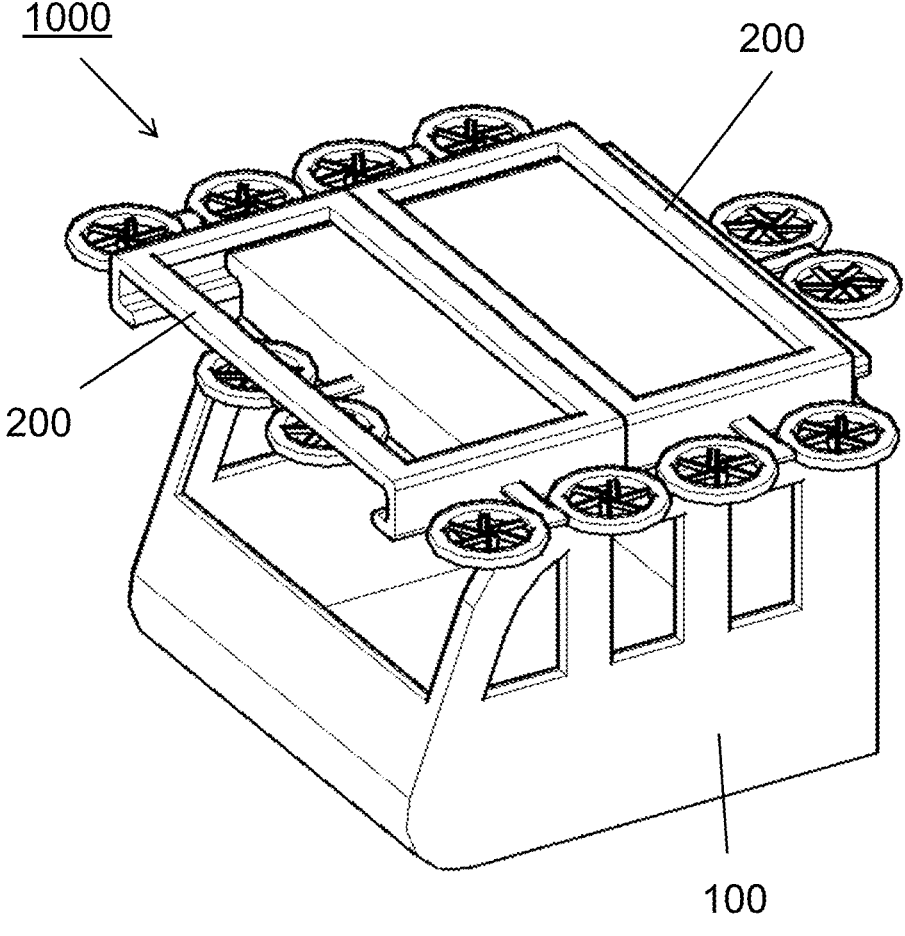
FIG. 5 is the air transport system according to the present invention of FIG. 1 in a state in which the replacing unmanned aircraft apparatus has been docked to the payload and has entered into interaction with the unmanned aircraft apparatus to be replaced previously detachably docked to the payload to replace this unmanned aircraft apparatus to be replaced.
Figure 6:
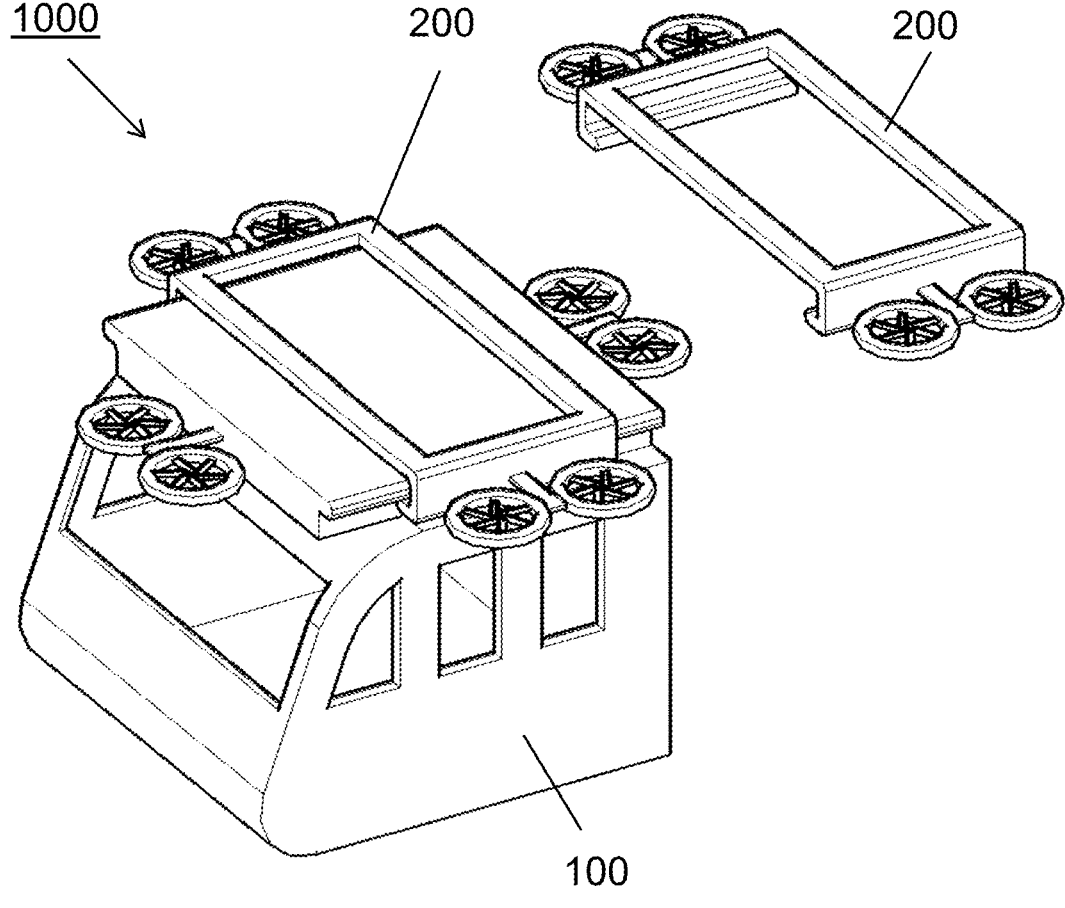
FIG. 6 is the air transport system according to the present invention of FIG. 1 in a state in which the replacing unmanned aircraft apparatus has remained at the target location on the payload, and the unmanned aircraft apparatus to be replaced previously detachably docked to the payload has been withdrawn from interaction with the payload as a result of the action of the replacing unmanned aircraft apparatus onto the former.

Furthermore, as shown in FIGS. 1 and 5-6, the docking module 130 is provided with two air propulsion units 120 defining a functional pair of air propulsion units operating under the control of the control device of the payload 100, wherein each of said air propulsion units 120 is secured on one of the two opposite shortened sides of the docking module 130 which sides extend generally perpendicular to the elongated sides of the docking module 130. The control device of the payload 100 is configured to present control commands to the air propulsion units 120 defining the above functional pair of air propulsion units for actuating (switching on) or switching off at least one or each of said air propulsion units 120. Of note, at least one or each of the air propulsion units 120 which are provided to the docking module 130 may be actuated under the control of the control device of the payload 100 prior to docking of the unmanned aircraft apparatus to the housing 110 of the payload or after undocking of the unmanned aircraft apparatus from the housing 110 of the payload, thus making it possible to enable the flight of the payload 100 for a predetermined period of time either completely without using the unmanned aircraft apparatuses 200 which are part of the air transport system 1000 and which must be docked to the housing 110 of the payload to enable the movement of the payload through the air, or using the minimum required number of unmanned aircraft apparatuses 200 docked to the housing 110 of the payload. It should also be noted that at least one or each of the air propulsion units 120, which are provided to the docking module 130, may be actuated under the control of the control device of the payload 100 while docking of one or more unmanned aircraft apparatuses 200 to the docking module 130 and, accordingly, may operate further to at least one of the air propulsion units 220 of at least one or each of said docked unmanned aircraft apparatuses 200 or may operate instead of at least one of the air propulsion units 220 of at least one or each of said docked unmanned aircraft apparatuses 200.

In one of the embodiments of the present invention, one or more air propulsion units 120 (for example, one, two, three, four, five, six, seven, eight, nine, ten or more air propulsion units 120) may be installed on at least one or at least each of the two opposite sides of the docking module 130, wherein the air propulsion units 120 disposed on said opposite sides of the housing may form at least one functional pair of air propulsion units operating under the control of the control device of the payload 100. FIGS. 1, 5 and 6 show an embodiment according to which each of the air propulsion units 120 comprises two air propellers. Further, in other embodiments, the air propulsion units 120 may comprise a different number of air propellers, for example, one, three, four, five, six, seven or more air propellers. The payload 100 in some embodiments may also include more than two air propulsion units 120, each of which may comprise one or more air propellers. For example, the payload 100 and/or the docking module 130 may comprise four air propulsion units 120, each comprising one propeller to form a system analogous to the illustrative example shown in FIGS. 1, 5 and 6. The number of air propulsion units 120 in certain embodiments may be two or more (for example, two, three, four, five, six, seven, eight, nine, ten or more air propulsion units 120), each of which comprises one or more air propellers (for example, one, two, three, four, five, six, seven, eight, nine, ten or more air propellers, which or at least some of which are installed in the same plane, in different planes or in parallel planes).

In another embodiment of the present invention, the housing 110 of the payload may not be provided with the docking module 130, and one or more air propulsion units 120 and one or more toothed docking mechanisms 140, which must be provided to the housing 110 of the payload, may be installed directly on the housing 110 of the payload itself or may be configured integral therewith.

In yet another embodiment of the present invention, at least one or each of the air propulsion units 120, which may be provided to the body of the docking module 130 or may be provided to the housing 110 of the payload, may be configured to extend, unfold or deploy from the housing 110 of the payload under the control of the control device of the payload 100.

In another embodiment of the present invention, at least one or each of the air propulsion units 120 which may be provided to the docking module 130 may be configured to alter the location thereof on the side of the docking module 130 on which side said air mover 120 is installed.

In some other embodiment of the present invention, at least one or each of the air propulsion units 120 which may be provided to the housing 110 of the payload may be configured to alter the location thereof on the side of the housing 110 of the payload on which said air mover 120 is installed. In one of the variations of this embodiment of the present invention, at least one or each of the air propulsion units 120 which may be provided to the housing 110 of the payload may be installed on one of the sides of the housing 110 of the payload on a guide and may be operably coupled to a drive device or a drive 100 of the payload, operating under the control of a control device of the payload 100 so as to enable displacement or movement of said air mover 120 along said guide by a predetermined distance regulated by the control device of the payload 100 in accordance with a predetermined route of movement stored in the memory device of the payload 100, to which the control device of the payload 100 has access or may acquire access. In another variation of this embodiment of the present invention, at least one or each of the air propulsion units 120 which may be provided to the housing 110 of the payload may be installed or secured on one of the sides of the housing 110 of the payload on a carriage installed on said side of the housing 110 of the payload and operably coupled to a drive device or a drive of the payload 100, operating under the control of the control device of the payload 100 so as to enable displacement or movement of said carriage with respect to the housing 110 of the payload by a predetermined distance regulated by the control device of the payload 100 in accordance with a predetermined route of movement stored in the memory device of the payload 100, to which the control device of the payload 100 has access or may acquire access.

Of note, the distance between the rows of docking mechanisms in the docking module 130 substantially corresponds to that between the two rectilinear toothed guides 230 which are provided to the housing 210 in the aircraft apparatus 200 being part of the air transport system 1000 and which is to be docked to the payload 100, thus allowing for said aircraft apparatus 200 to readily dock to the housing 110 of the payload by substantially simultaneously introducing each of the two rectilinear toothed guides 230 into a detachable toothed interaction with the toothed docking mechanism 140 relating to one of the two rows of docking mechanisms of the housing 110, corresponding to said rectilinear toothed guide 230, and being close or proximal with respect to said aircraft apparatus 200 to be docked.

While movement of the unmanned aircraft apparatus 200 docked to the docking module 130 with respect to the housing 110 of the payload to occupy a target location (i.e., to be placed in a target spot) on the housing 110 of the payload, each of the two rectilinear toothed guides 230 at different moments (periods) of time is sequentially introduced into a detachable toothed interaction (i) only with the proximal toothed docking mechanism 140 relating to one of the two rows of docking mechanisms of the housing 110, corresponding to said rectilinear toothed guide 230, (ii) simultaneously with said proximal toothed docking mechanism 140 and the middle toothed docking mechanism 140 disposed between said proximal toothed docking mechanism 140 and the distal toothed docking mechanism 140 being most distant from the proximal toothed docking mechanism 140, and (iii) only with said middle toothed docking mechanism 140. Of note, the control device of the payload 100 is functionally coupled to the toothed docking mechanisms 140 so as to enable the control of the operation thereof, in particular to enable the altering of operating parameters thereof, for example, the rotation speed, the direction of rotation, and the like such that in order for the aircraft apparatus 200 docked to the docking module 130 to occupy a target location (i.e., to be placed in a target spot) on the housing 110 of the payload, the control device of the payload 100 presents control commands to those toothed docking mechanisms of the proximal and middle toothed docking mechanisms 140 that must be employed at different moments (periods) of time in order to enable the movement of said unmanned aircraft apparatus 200 with respect to the housing 110 of the payload to said target location. Thus, the toothed docking mechanisms of the proximal and middle toothed docking mechanisms 140 actuated in response to the respective control commands of the control device of the payload 100 rotate in a predetermined direction and at a predetermined rotation speed so as to enable the introduction of the teeth of these actuated docking mechanisms 140 into a detachable toothed interaction with the respective teeth 240 configured on the respective rectilinear toothed guides 230, thus enabling the advance of the aircraft apparatus 200 to a target location on the housing 110 of the payload, known to the control device of the payload 100. Of note, the housing 110 of the payload may be further provided with a contact sensor which may be configured to detect or identify the docking of the unmanned aircraft apparatus 200 with the housing 110 of the payload and which may be communicatively coupled to the control device of the payload 100 so as to enable the output of data about the detected docking to the control device of the payload 100 for bringing, by means of the control device of the payload 100, the required toothed docking mechanisms which must provide for the movement of the docked unmanned aircraft apparatus 200 with respect to the housing 110 of the payload to occupy a target location thereof controlled by the control device of the payload 100.

In one of the embodiments of the present invention, the unmanned aircraft apparatus 200 docked to the housing 110 of the payload may be moved with respect to the housing 110 of the payload to a target location on the housing 110 of the payload under the action of the forces of inertia (i.e., by inertia) generated at the moment of docking of said unmanned aircraft apparatus 200 with the housing 110 of the payload and sufficient to provide for substantially rectilinear advance of the docked unmanned aircraft apparatus 200, whose rectilinear toothed guides 230 have been introduced into detachable toothed interaction with the respective toothed docking mechanisms 140, with respect to the housing 110 of the payload to a target location on the housing 110 of the payload. Thus, in this embodiment of the present invention, the forces of inertia possessed by the unmanned aircraft apparatus 200 at the moment of docking thereof with the housing 110 of the payload are sufficient to rotate the toothed docking mechanisms 140 which are provided to the housing 110 of the payload in a predetermined direction so as to enable the advance of the docked unmanned aircraft apparatus 200 with respect to the housing 110 of the payload to a target location on the housing 110 of the payload.

As shown in FIG. 1, yet another or the other (second) unmanned aircraft apparatus 200 being part of the air transport system 1000 may be detachably docked to the docking module 130, which is already provided with an unmanned aircraft apparatus 200 also being part of the air transport system 1000 and previously docked to the docking module 130, by way of introducing each of the two rectilinear toothed guides 230 into detachable toothed interaction with the toothed docking mechanism 140 relating to one of the two rows of docking mechanisms of the housing 110, corresponding to said rectilinear toothed guide 230, and being close or proximal with respect to said aircraft 200 to be docked. In other words, at any moment of time in the system 1000, yet another or other (second) unmanned aircraft apparatus 200 may be docked to the docking module 130 further to the previously docked thereto unmanned aircraft apparatus 200 disposed on the housing 110 of the payload at a target location.

As shown in FIG. 5, while further movement of the other unmanned aircraft apparatus 200, further docked to the docking module 130, with respect to the housing 110 of the payload for occupying by same a target location thereof (i.e. for being placed in a target spot) on the housing 110 of the payload, each of the two rectilinear toothed guides 230 relating to said other unmanned aircraft apparatus 200 at different moments (periods) of time is sequentially introduced into a detachable toothed interaction with one or more of the toothed docking mechanisms 140 which are provided to the docking module 130.

As shown in FIG. 6, in order for the other unmanned aircraft apparatus 200 to occupy a target location thereof on the housing 110 of the payload, there is enabled the advance of said other unmanned aircraft apparatus 200 towards the previously docked unmanned aircraft apparatus 200 under the control of the control device of the payload 100, followed by a contact action of said other unmanned aircraft apparatus 200 onto said previously docked unmanned aircraft apparatus 200, wherein said contact action in turn enables the placement of said other unmanned aircraft apparatus 200 in the target location thereof on the housing 110 of the payload (for example, in a target location on the housing 110 of the payload corresponding to the target location of the previously docked unmanned aircraft apparatus 200), controlled or monitored by the control device of the payload 100, and enables further advance of said previously docked unmanned aircraft apparatus 200 with respect to the housing 110 of the payload, followed by the withdrawal of said previously docked unmanned aircraft apparatus 200 from interaction with the respective docking mechanisms 140, resulting in undocking of said previously docked unmanned aircraft apparatus 200 from the docking module 130 and, accordingly, from the housing 110 of the payload. Of note, the control of the operation of the unmanned aircraft apparatus 200 undocked from the payload 100 may be switched to the control device of this undocked unmanned aircraft apparatus 200 or an external control device. Of note, the above process of docking yet another unmanned aircraft apparatus 200 to the housing 110 of the payload and the above process of undocking the unmanned aircraft apparatus 200 previously docked to the housing 110 of the payload from said payload housing 110, in particular from the docking module 130 which is provided to the housing 110 of the payload, may be implemented or carried out under the control of the control device of the payload 100 while movement of the payload 100 through the air. In some embodiments of the present invention, the above process of docking yet another unmanned aircraft apparatus 200 to the housing 110 of the payload and the above process of undocking the unmanned aircraft apparatus 200 previously docked to the housing 110 of the payload from said payload housing 110 may be implemented or carried out under the control of the control device of the payload 100 while presence of the housing 110 of the payload on the surface of the earth, on which surface the payload was placed upon completion of landing or from which surface the payload 100 must be lifted into the air upon takeoff.

According to one embodiment of the present invention, while the advance of yet another or other (second) unmanned aircraft apparatus 200 docked to the docking module 130 further to the previously docked unmanned aircraft apparatus 200 towards said previously docked unmanned aircraft apparatus 200 under the control of the control device of the payload 100, there may be enabled the stopping of said other unmanned aircraft apparatus 200 in a target location thereof on the housing 110 of the payload, in which location the housing 210 relating to said other unmanned aircraft apparatus 200 abuts to or is immediately adjacent to the housing 210 relating to said previously docked unmanned aircraft apparatus 200. Thus, in this embodiment of the present invention, to the docking module 130 there may be docked two unmanned aircraft apparatuses 200 disposed on the housing 110 of the payload in target locations thereof immediately adjacent to one another, wherein, in order to move the payload 100 through the air, the control device of the payload 100 may control the operation (for example, switch on, switch off or alter the operating characteristics) of at least one or each of the air propulsion units 220 in one of said two docked unmanned aircraft apparatuses 200, of at least one or each of the air propulsion units 220 in the other one of said two docked unmanned aircraft apparatuses 200, and/or of at least one or each of the air propulsion units 120.

According to yet another embodiment of the present invention, while the advance of yet another or other (second) unmanned aircraft apparatus 200 docked to the docking module 130 further to the previously docked unmanned aircraft apparatus 200 towards said previously docked unmanned aircraft apparatus 200 under the control of the control device of the payload 100, there may be enabled the stopping of said other unmanned aircraft apparatus 200 in a target location on the housing 110 of the payload, in which location said other unmanned aircraft apparatus 200 is present at a distance from said previously docked unmanned aircraft apparatus 200. Thus, in this embodiment of the present invention, to the docking module 130 there may be docked two unmanned aircraft apparatuses 200 disposed on the housing 110 of the payload in target locations thereof at a distance from one another, which distance is regulated or controlled by the control device of the payload 100, wherein, in order to move the payload 100 through the air, the control device of the payload 100 may control the operation (for example, switch on, switch off or alter the operating characteristics) of at least one or each of the air propulsion units 220 in one of said two docked unmanned aircraft apparatuses 200, of at least one or each of the air propulsion units 220 in the other one of said two docked unmanned aircraft apparatuses 200, and/or of at least one or each of the air propulsion units 120.

According to another embodiment of the present invention, while the advance of yet another or other (second) unmanned aircraft apparatus 200 docked to the docking module 130 further to the previously docked unmanned aircraft apparatus 200 towards said previously docked unmanned aircraft apparatus 200 under the control of the control device of the payload 100, there may be enabled the action of said other unmanned aircraft apparatus 200 onto said previously docked unmanned aircraft apparatus 200 to place this other unmanned aircraft apparatus 200 in a target location thereof on the housing 110 of the payload and to advance said previously docked unmanned aircraft apparatus 200 to the new target location thereof on the housing 110 of the payload, in which location the housing 210 thereof is present immediately adjacent to the housing 210 relating to said other unmanned aircraft apparatus 200, or in which location said previously docked unmanned aircraft apparatus 200 is present on the housing 110 of the payload at a predetermined distance from said other unmanned aircraft apparatus 200, which distance is regulated or controlled by the control device of the payload 100. Thus, in this embodiment of the present invention, to the docking module 130 there may be docked two unmanned aircraft apparatuses 200 disposed on the housing 110 of the payload in target locations thereof immediately adjacent to one another, which locations they will occupy as a result of the contact interaction thereof with one another, wherein, in order to move the payload 100 through the air, the control device of the payload 100 may control the operation (for example, switch on, switch off or alter the operating characteristics) of at least one or each of the air propulsion units 220 in one of said two docked unmanned aircraft apparatuses 200, of at least one or each of the air propulsion units 220 in the other one of said two docked unmanned aircraft apparatuses 200, and/or of at least one or each of the air propulsion units 120.

According to another embodiment of the present invention, further to the unmanned aircraft apparatus 200 previously docked to the docking module 130 and being present on the housing 110 of the payload in a target location thereof, to the docking module 130 there may be sequentially (at predetermined intervals or periods of time) docked two or more unmanned aircraft apparatuses 200. In one variation of this embodiment of the present invention, all unmanned aircraft apparatuses 200 (i.e. two or more further docked unmanned aircraft apparatuses 200 and the previously docked unmanned aircraft apparatus 200) docked to the docking module 130 may occupy the target locations thereof on the housing 100 of the payload which are regulated or controlled by the control device of the payload 100. In another variation of this embodiment of the present invention, each or at least one of the one or more unmanned aircraft apparatuses 200 further docked to the docking module 130 may occupy a target location thereof on the housing 100 of the payload, the target location being regulated or controlled by the control device of the payload 100, and the unmanned aircraft apparatus 200 previously docked to the docking module 130 may be undocked from the housing 110 of the payload while docking, to the housing 110 of the payload, of one or the last one of said additional unmanned aircraft apparatuses 200. In yet another variation of this embodiment of the present invention, one or more of the unmanned aircraft apparatuses 200 further docked to the docking module 130 may be sequentially undocked from the housing 110 of the payload after undocking of the unmanned aircraft apparatus 200 previously docked to the docking module 130 from the housing 110 of the payload.

In one of the embodiments of the present invention, at least one of the docking mechanisms 140 which may be provided to the housing 110 of the payload may be further configured to enter into a detachable toothed interaction with the rectilinear toothed guide 230, which may be provided to yet another (other or second) unmanned aircraft apparatus 200 to be docked to the docking module 130 or the housing 110 of the payload further to the unmanned aircraft apparatus 200 previously docked to the housing 110 of the payload and located in a target location on the housing 110 of the payload so as to enable the movement of said other unmanned aircraft apparatus 200 with respect to the housing 110 of the payload towards said previously docked unmanned aircraft apparatus 200, thus enabling (i) the placement of said other unmanned aircraft apparatus 200 in a target location thereof on the housing 110 of the payload located at a predetermined distance from the target location on the housing 110 of the payload which location is occupied by said previously docked unmanned aircraft apparatus, (ii) the action of said other unmanned aircraft apparatus 200 onto said previously docked unmanned aircraft apparatus 200 for placing this other unmanned aircraft apparatus 200 in a target location thereof on the housing 110 of the payload and for advancing said previously docked unmanned aircraft apparatus 200 to the new target location thereof on the housing 110 of the payload, or (iii) the action of said other unmanned aircraft apparatus 200 onto said previously docked unmanned aircraft apparatus 200 for placing this other unmanned aircraft apparatus 200 in a target location thereof on the housing 110 of the payload (for example, in a target location on the housing 110 of the payload corresponding to the target location of the previously docked unmanned aircraft apparatus 200 on the housing 110 of the payload) and for withdrawing said previously docked unmanned aircraft apparatus 200 from interaction with said at least one docking mechanism 140 followed by undocking same from the housing 110 of the payload.

Of note, while the advance of the unmanned aircraft apparatus 200 previously docked to the housing 110 of the payload as a result of contact interaction with yet another or other unmanned aircraft apparatus 200 further docked to the housing 110 of the payload towards undocking from the payload 100, each of the two rectilinear toothed guides 230 at different moments (periods) of time is sequentially introduced into a detachable toothed interaction (i) only with the middle toothed docking mechanism 140, (ii) simultaneously with the middle and distal toothed docking mechanisms 140, and (iii) only with the distal toothed docking mechanism 140, wherein upon withdrawal of the both rectilinear toothed guides 230 from toothed interaction with the respective distal toothed docking mechanisms 140 there takes place the undocking of said aircraft apparatus from the housing 110 of the payload. Of note, the control device of the payload 100 presents control commands to those toothed docking mechanisms of the middle and distal toothed docking mechanisms 140 that must be employed at different moments (periods) of time to enable movement of said unmanned aircraft apparatus 200 with respect to the housing 110 of the payload until the moment of undocking from the housing 110 of the payload. Thus, the toothed docking mechanisms of the middle and distal toothed docking mechanisms 140 actuated in response to the respective control commands of the control device of the payload 100 rotate in a predetermined direction and at a predetermined rotation speed so as to enable the introduction of the teeth of these actuated docking mechanisms 140 into a detachable toothed interaction with the respective teeth 240 configured on the respective rectilinear toothed guides 230 which are provided to the unmanned aircraft apparatus 200 to be undocked (being undocked), thus enabling the further advance of said unmanned aircraft apparatus 200 from a target location thereof on the housing 110 of the payload, known to the control device of the payload 100, until undocking from the housing 110 of the payload.

According to one embodiment of the present invention, the movement of the unmanned aircraft apparatus 200 with respect to the housing 110 of the payload from the spot of docking of this unmanned aircraft apparatus 200 to the housing 110 of the payload to a target location on the housing 110 of the payload and from the target location on the housing 110 of the payload to the spot of undocking of this unmanned aircraft apparatus 200 from the housing 110 of the payload may be implemented or carried out by means of introduction of each of the two rectilinear toothed guides 230 into detachable toothed interaction only with the respective one of the toothed docking mechanisms 140 at each individual moment (period) of time of movement (for example, by sequential introduction of each of the two rectilinear toothed guides 230 only with the respective one of the two proximal toothed docking mechanisms 140, only with the respective one of the two middle toothed docking mechanisms 140, and only with the respective one of the two distal toothed docking mechanisms 140).

According to another embodiment of the present invention, the movement of the unmanned aircraft apparatus 200 with respect to the housing 110 of the payload from the spot of docking of this unmanned aircraft apparatus 200 to the housing 110 of the payload to a target location on the housing 110 of the payload and from the target location on the housing 110 of the payload to the spot of undocking of this unmanned aircraft apparatus 200 from the housing 110 of the payload may be implemented or carried out by means of introduction of each of the two rectilinear toothed guides 230 into a detachable toothed interaction only with the respective one or respective two of the toothed docking mechanisms 140 at each individual moment (period) of time of movement.

According to another embodiment of the present invention, while sequential docking of two unmanned aircraft apparatuses 200 to the docking module 130 or the housing 110 of the payload on one of the sides of the housing 110 of the payload or while substantially simultaneous docking of two unmanned aircraft apparatuses 200 to the docking module 130 or to the housing 110 of the payload on two opposite sides of the housing 110 of the payload, these docked unmanned aircraft apparatuses 200 may be moved with respect to the housing 110 of the payload to target locations thereof on the housing 110 of the payload, wherein the housing 210 of at least one of said docked unmanned aircraft apparatuses 200 may be configured to enable the housing of other unmanned aircraft apparatus of said docked unmanned aircraft apparatuses 200 to extend therethrough. Thus, in this embodiment of the present invention, the housings 210 of the unmanned aircraft apparatuses 200 docked to the housing 110 of the payload and situated in target locations thereof on the housing 110 of the payload may at least partially overlap one another or may be at least partially placed one above the other so as to provide for placement of the air propulsion units 220 thereof at different heights or one above the other. In one of the variations of this embodiment of the present invention, the housing 210 in at least one or each of the unmanned aircraft apparatuses 200 docked to the housing 110 of the payload may be configured extendible or expandable, wherein the extension or expansion of said housing 210 may be controlled by the control device of the payload 100 while movement of said docked aircraft apparatus 200 with respect to the housing 110 of the payload. Thus, in this variation of this embodiment of the present invention, the expansion of the housing 210 of one of the unmanned aircraft apparatuses 200 docked to the housing 110 of the payload under the control of the control device of the payload 100, which device regulates or controls the degree of expansion, allows the housing 210 relating to the other unmanned aircraft apparatus of said unmanned aircraft apparatuses 200 to extend through said expanded housing 210 while movement of said other unmanned aircraft apparatus 200 with respect to the housing 110 of the payload or allows said expanded housing 210 to extend over the housing 210 relating to said other unmanned aircraft apparatus 200 while movement of said unmanned aircraft apparatus 200 with the expanded housing 210 with respect to the housing 110 of the payload.

In one of the embodiments of the present invention, the rectilinear toothed guides 230 which are provided to the housing 210 in each of the unmanned aircraft apparatuses 200 being part of the air transport system 1000 may be individual structural parts, coupled each (detachably or undetachably) to said housing 210 using one or more connecting elements or means known in the prior art, or fastened (detachably or undetachably) each to said housing 210 using one or more fastening elements or fastening means known in the prior art.

In another embodiment of the present invention, the housing 210 in each of the unmanned aircraft apparatuses 200 being part of the air transport system 1000 may be provided with two rectilinear toothed guides 230 configured integral with the housing 210 at a predetermined distance from one another, wherein said toothed guides 230 may be situated generally parallel to one another and may be provided each with a row of teeth, wherein the teeth 240 have a shape and dimensions suitable for entering into a detachable toothed interaction with the respective teeth of the docking mechanisms 140 while docking of said unmanned aircraft apparatus 200 to the docking module 130 or movement of such docked unmanned aircraft apparatus 200 with respect to the housing 110 of the payload.

In yet another embodiment of the present invention, the housing 210 in each of the unmanned aircraft apparatuses 200 being part of the air transport system 1000 may be provided with only one rectilinear toothed guide 230, wherein the teeth 240 have a shape and dimensions suitable for entering into a detachable toothed interaction with the respective teeth of the docking mechanisms 140, which may be provided to the housing 110 of the payload and which may be installed in a row at a predetermined distance from one another (for example, at an equal distance or different distances from one another), while docking of said unmanned aircraft apparatus 200 to the docking module 130 or movement of such docked unmanned aircraft apparatus 200 with respect to the housing 110 of the payload. In one of the variations of this embodiment of the present invention, at each moment of time while movement of the unmanned aircraft apparatus 200 docked to the docking module 130 with respect to the housing 110 of the payload for occupying a target location (i.e. for being placed in a target spot) on the housing 110 of the payload or for undocking from the housing 110 of the payload, the single rectilinear toothed guide 230 may be introduced, by means of one or more of the teeth 240 thereof, into a detachable toothed interaction with only one of the docking mechanisms 140 which may be provided to the housing 110 of the payload. In another variation of this embodiment of the present invention, at each moment of time while movement of the unmanned aircraft apparatus 200 docked to the docking module 130 with respect to the housing 110 of the payload for occupying a target location (i.e. for being placed in a target spot) on the housing 110 of the payload or for undocking from the housing 110 of the payload, a single rectilinear toothed guide 230 may be introduced into a detachable toothed interaction simultaneously with two or more of the docking mechanisms 140 (in particular, with two, three, four, five, six, seven, nine, ten or more docking mechanisms 140) which may be provided to the housing 110 of the payload using two or more groups of teeth, respectively, of said toothed guide 230, each substantially corresponding to one of said docking mechanisms 140 introduced into interaction and each comprising one or more successively arranged teeth of the teeth 240 which are provided to said toothed guide 230. In yet another variation of this embodiment of the present invention, at different stages of movement of the aircraft apparatus 200 docked to the docking module 130 with respect to the housing 110 of the payload for occupying a target location (i.e. for being placed in a target spot) on the housing 110 of the payload or for undocking from the housing 110 of the payload, the single rectilinear toothed guide 230 may be introduced, by means of one or more of the teeth 240 thereof, into a detachable toothed interaction with only one of the docking mechanisms 140 which may be provided to the housing 110 of the payload, or may be introduced into a detachable toothed interaction simultaneously with two or more of the docking mechanisms 140 which may be provided to the housing 110 of the payload using two or more groups of teeth, respectively, which are provided to said toothed guide 230 and each of which groups corresponds to one of said docking mechanisms 140. One skilled will readily appreciate that in the above variations of this embodiment of the present invention, at different moments of time during the period of movement of said unmanned aircraft apparatus 200 with respect to the housing 110 of the payload, one and the same docking mechanism 140 from among the docking mechanisms 140 which may be provided to the housing 110 of the payload is introduced into a detachable toothed interaction with different groups of teeth which comprise one or more successively arranged teeth of the teeth 240 which are provided to the rectilinear toothed guide 230. Furthermore, one skilled will readily appreciate that in the above variations of this embodiment of the present invention, while movement of the unmanned aircraft apparatus 200 with respect to the housing 110 of the payload, each of the docking mechanisms 140 which may be provided to the housing 110 of the payload is sequentially introduced into a detachable toothed interaction with each of the teeth 240 which are provided to the rectilinear toothed guide 230, or with only at least a portion of said teeth 240. Furthermore, one skilled will readily appreciate that in the above variations of this embodiment of the present invention, while placement of the aircraft apparatus 200 docked to the docking module 130 in a target location on the housing 110 of the payload, the toothed guide 230 may be introduced into a detachable toothed interaction with one or more of the docking mechanisms 140 (in particular, depending on the variation of this embodiment of the present invention) using one or more groups of teeth 240, respectively, each of which groups corresponds to one of said docking mechanisms 140 and each of which groups comprises one or more successively arranged teeth of the teeth 240.

In some embodiments of the present invention, the housing 110 of the payload may be provided with one or more docking modules (not shown), each of which may be accessible from one of the sides of the housing 110 of the payload and to each of which, at any particular moment or period of time, there may be docked one or more unmanned aircraft apparatuses 200 being part of the air transport system 1000.

In other embodiments of the present invention, the housing 110 of the payload may be provided with some special docking module, and one or more unmanned aircraft apparatuses 200 being part of the air transport system 100 may be sequentially docked directly to the housing 110 of the payload on one of the sides thereof or may be substantially simultaneously docked to the housing 110 of the payload on different sides thereof.

In other embodiments of the present invention, the housing 110 of the payload may be provided with one or more docking mechanisms 140, each of which may be configured to detachably toothedly interact with the toothed guide 230 which is provided to the housing 210 in the unmanned aircraft apparatus 200 to be docked being part of the air transport system 1000 so as to enable the movement of said unmanned aircraft apparatus 200, while docking thereof to the payload 100, with respect to the housing 110 of the payload.

According to one embodiment of the present invention, the docking module 130, which is provided to the housing 110 of the payload, may be provided with any toothed docking mechanism 140 or may contain any toothed docking mechanism 140 known in the prior art suitable for entering into a detachable toothed interaction with one or more of or a portion of the teeth 240 provided on the toothed guide 230, which is provided to the housing 210 of the aircraft apparatus, wherein the detachable interaction between said toothed docking mechanism 140 and said teeth 240 enables formation of a detachable coupling between the docking module 130 and the housing 210 of the aircraft apparatus and, accordingly, a detachable coupling between the payload 100 and said aircraft apparatus 200.

According to another embodiment of the present invention, the docking module 130 which is provided to the housing 110 of the payload may be configured to be at least partially situated in the housing 110 of the payload. Thus, the docking module 130 in this embodiment of the present invention may be at least partially recessed or sunk into the housing 110 of the payload.

According to another embodiment of the present invention, the docking module 130, which is provided to the housing 110 of the payload, may be installed in the housing 110 of the payload so as to extend, unfold or deploy therefrom under the control of the control device of the payload 100, in particular in response to control commands of the control device of the payload 100, control commands of the aircraft apparatus 200 which must be detachably docked to the housing 110 of the payload, or control commands of an external control device (i.e., an external control source).

As shown in FIG. 1, the housing 110 is configured in the form of a passenger or user cabin configured to accommodating therein one or more people (for example, one or more passengers and/or a pilot), wherein, further thereto, in said cabin there may be accommodated various living creatures and/or various loads of any type, wherein said user cabin may be further provided with viewing windows and an entrance in the form of an entrance door or hatch. Of note, the housing 110, to which there may be docked or coupled one or more unmanned aircraft apparatuses 200 may be used for the delivery, carriage or transportation of people, various living beings and/or cargos of various types (solid, gaseous, liquid, fluid, bulk, viscous, radioactive, chemical, and/or the like) through the air to a target location which in turn may be located on the surface of the ground (on land), on the surface of a mobile or stationary ground object (for example, on a ground platform, bridge, TV tower, truck housing, roof of a building, or the like), the surface of a stationary water object (for example, on an offshore platform, a marine buoy, pontoon, or the like), the surface of a movable water object (for example, on the deck of a ship, barge, diesel-engine-powered ship, liner, power boat, or the like), the surface of a stationary or movable air object (for example, on the fuselage of an airplane, balloon, or the like) or the surface of any other suitable objects known from the prior art.

In the internal space of the housing 110 of the payload there may be installed a seat which may accommodate a driver, user or pilot capable of controlling the travel or movement of the payload 100 through the air using a steering mechanism or rudder (i.e. an element for controlling the direction of travel or movement) which is provided to a control panel secured or installed in the internal space of the housing 110, wherein the function of the pilot may be performed by any of the users or passengers being present in said internal space of the housing 110. The control panel may comprise an instrument panel, monitoring elements and control elements necessary for the pilot to control the movement of the payload 100 through the air to a target region of space, including for the subsequent landing of the payload 100 to place this payload 100 in a parking place, a storage place, a place for replenishing the range, a repair place, a maintenance place, or the like.

In one of the embodiments of the present invention, in the internal space of the housing 110 of the payload, further to the pilot, there may be further accommodated at least one passenger, at least one passenger's baggage item and/or at least one cargo item, wherein said pilot, passengers, cargo items and passenger's baggage items may be accommodated in respective places in the common internal space or may each be accommodated in respective individual area thereof at least partially limited by one or more partitions, or in an individual compartment at least partially limited by one or more partitions. In one of the variations of this embodiment of the present invention, the seat may be disposed in the pilot's cabin formed in the internal space of the housing 110 of the payload and separated by a partition from the remaining portion of the internal space of the housing 110, which remaining portion in turn may be divided by other partition into a passenger compartment, in which compartment there may be installed one or more passenger seats to accommodate therein passengers, and into a baggage or cargo compartment, in which compartment there may be accommodated cargo (in particular, one or more cargo items) and/or passenger's baggage (in particular, one or more passenger's baggage items), wherein said cargo items, passenger's baggage items and/or passenger seats may be disposed or secured on the bottom, floor and/or walls of the housing 110. In another variation of this embodiment of the present invention, in the passenger compartment in the housing 110 of the payload, instead of or further to passenger seats, there may be provided the following: (i) rails installed on the lateral walls, floor and/or ceiling of the housing 110 for accommodating passengers in any position in the housing 110 of the payload, for example, sitting or standing position on the floor of the housing 110; (ii) couches, beds or benches secured to the floor, walls and/or ceiling of the housing 110 for accommodating thereon passengers in a sitting, standing and/or lying position; (iii) specialized areas for accommodating disabled people in a sitting, standing and/or lying position; (iv) specialized areas for wheelchairs used by disabled people; (v) specialized areas for accommodating baby cots used by infants and (if necessary) specialized areas for accompanying persons; (vi) specialized areas for accommodating gurneys for transporting patients used by bedridden patients, and/or (vii) specialized areas for accommodating sports equipment. Of note, the quantity of passengers in the passenger compartment in the housing 110 of the payload may be from one person to several tens or even hundreds of people without making any limitations, wherein said quantity of passengers is substantially limited only by the volume or size of the passenger compartment within the internal space of the housing 110. In yet another variation of this embodiment of the present invention, in the cargo compartment of the housing 110 of the payload there may be enabled not only accommodation of cargo and/or passenger luggage on the floor of the housing 110 but also attachment thereof in the cargo compartment of the housing 110 using conventional fastening means known from the prior art, wherein in the cargo compartment of the housing 110 there may be further provided shelves, hangers, crates and other carrying means attached to the floor, ceiling and/or lateral walls of the housing 110 and allowing additional cargo items and/or passenger luggage items to be accommodated in the cargo compartment of the housing 110. In another variation of this embodiment of the present invention, the areas for passenger luggage, including shelves, hangers, boxes, and other carrying means for accommodating passenger luggage items, may only be provided in the passenger compartment of the housing 110 of the payload further to the above variants of means for accommodating passengers in said passenger compartment. One skilled in the art would readily appreciate that cargo items and/or passenger luggage items may be at least partially secured or fixed also from the external side of the housing 110 using suitable fastening means known in the prior art (for example, using a dedicated enclosed-type attached equipment used in airplanes, cars, motorcycles, helicopters, bicycles, and the like). Of note, the above pilot cabin, passenger compartment and cargo compartment in the housing 110 of the payload may be configured in general analogously to the respective compartments of airplanes, helicopters, buses, cars, ships, power boats, or the like.

In yet another embodiment of the present invention, the seat may be disposed in the pilot cabin in the internal space of the housing 110 of the payload which pilot cabin is separated by a partition from the remaining portion of the internal space of the housing 110 in which portion, in turn, on the bottom, ceiling and/or floor of the housing 110 there may be accommodated or fastened passengers (for example, in passenger seats), cargo items and passenger luggage items. Furthermore, an embodiment of the present invention is possible, wherein only the pilot and passengers may be accommodated in the internal space of the housing 110 of the payload; an embodiment of the present invention is possible, wherein only the pilot and cargo may be accommodated in the internal space of the housing 110; an embodiment of the present invention is possible, wherein only passengers and cargo may be accommodated in the internal space of the housing 110; an embodiment of the present invention is possible, wherein only one or more passengers may be accommodated in the internal space of the housing 110, one of whom may perform the function of a pilot; an embodiment of the present invention is possible, wherein only the pilot may be accommodated in the internal space of the housing 110 (for example, in the pilot's seat), who is simultaneously a passenger of the payload 100.

The control elements (not shown) in the housing 110 of the payload which are part of the control panel enable the control of the payload 100 in a semi-automatic mode (i.e. a combination of performance of manual control by the pilot and performance of automatic control by the on-board systems using an autopilot responsible for at least the safety of travel or movement of the payload 100 through the air) such that the control elements of the control panel of the payload 100 may be used by the pilot being present in the seat and monitoring the instrument readings on the instrument panel of the control panel for manual input of at least one control command. Of note, the control elements of the control panel are communicatively coupled to the control device of the payload 100 so as to enable the presenting of each of the pilot's control commands to said control device of the payload 100, wherein some of said pilot's control commands may substantially substitute the respective control commands of the control device of the payload 100 generated by the control device of the payload 100 during the travel or movement of such payload 100 in automatic mode (i.e. in autopilot mode) through the air to a target region of space or a target location.

In other embodiments of the present invention, the housing 110 of the payload may be formed from two or more individual cabins detachably docked or coupled to one another (for example, from two, three, four, five, six, seven, eight, nine, ten or more individual cabins) having one and the same type or different types.

Of note, the unmanned aircraft apparatuses 200 detachably coupled or docked to the housing 110 of the payload may respond as an integral whole to control commands and/or control instructions being received from the control device of the payload 100. In particular, the operation of the unmanned aircraft apparatuses 200 detachably docked to the housing 110 of the payload may be synchronized using the control device of the payload 100 (alternatively, using the control device of at least one or each of the unmanned aircraft apparatuses 200 and/or the control device of the payload 100). Furthermore, at least one or each of the unmanned aircraft apparatuses 200 detachably coupled or docked to the housing 110 of the payload may be electrically coupled to the payload 100 to form a single power supply circuit and to form a cluster power source (for example, the cluster power source may be formed from one or more integrated batteries included in at least one or each of the unmanned aircraft apparatuses 200, and/or one or more integrated batteries installed in or on the housing 110 of the payload), wherein the process of charging such cluster power source and the process of distributing power supply energy between the functional components of the unmanned aircraft apparatuses 200 installed in or on the housing 110 of the payload may be controlled by the control device of the payload 100 (alternatively, the control device of at least one or each of the unmanned aircraft apparatuses 200 and/or the control device of the payload 100).

Of note, the process of detachable coupling or detachable docking of one or more unmanned aircraft apparatuses 200 to the housing 110 of the payload may take place directly in the air in response to control commands and/or navigation commands issued by the control device of the payload 100 to said unmanned aircraft apparatuses 200, i.e., it may take place under the control of the control device of the payload 100.

It should also be noted that in any one of the embodiments of the present invention described herein, a reference to the use of the control device of the unmanned aircraft apparatus 200 for controlling, monitoring or performing the described operation is not limiting, i.e. it will be appreciated by one skilled that, instead of the control device of the unmanned aircraft apparatus 200, there may be used the control device of the payload 100, the control device of other unmanned aircraft apparatus 200, an external control device or any suitable combination thereof. In particular, while detachable coupling or detachable docking of the unmanned aircraft apparatus 200 to the housing 110 of the payload, the control of such docked unmanned aircraft apparatus 200 may be intercepted by the control device of the payload 100 or the control device of other unmanned aircraft apparatus 200 already (previously) coupled or docked to the housing 110 of the payload, or the control of such unmanned aircraft apparatus 200 may be carried out by means of the control device of this unmanned aircraft apparatus 200 in response to navigation commands and/or control commands of the control device of the payload 100.

In one of the embodiments of the present invention, the housing 110 of the payload may comprise an (embedded) integrated power supply source (not shown) configured in the form of a battery, one or more rechargeable batteries, an internal combustion engine generator, a hydrogen engine generator, a generator based on one or more solar panels, or a generator based on any other suitable energy source known from the prior art, wherein said integrated power supply source may also be configured to be charged from an external power supply source (not shown) using a charging device (not shown) of a suitable type coupled to said external power supply source and configured to connect thereto said integrated power supply source of the housing 110. In particular, the integrated power supply source in the housing 110 of the payload may be coupled, by means of a power supply circuit thereof, to the control device of the payload 100 and any other functional components of the payload 100 described herein so as to enable the supply of power thereto or to enable them to be powered. In another embodiment of the present invention, the integrated power supply source of the housing 110 of the payload may be charged in a wireless manner using an external charging device (not shown) whose operation is based on the principle of electromagnetic induction which will be appreciated by one skilled in art.

In another embodiment of the present invention, the unmanned aircraft apparatus 200 docked to the docking module 130 and the functional components installed in or on the housing 110 of the payload may have individual power supply circuits.

In another embodiment of the present invention, the power supply circuit of the unmanned aircraft apparatus 200 docked to the docking module 130 and one or more power supply circuits of the functional components installed in or on the housing 110 of the payload may be electrically coupled to one another to form a combined power supply circuit and a combined charging circuit.

In some other embodiment of the present invention, the housing 110 of the payload may be further provided with a limiting member configured to limit the movement of the unmanned aircraft apparatus 200 docked to the docking module 130 with respect to the housing 110 of the payload while actuation of said limiting member to prevent or eliminate the possibility of the unintentional exit of the toothed guides of the unmanned aircraft apparatus 200 from the detachable toothed interaction with the respective toothed docking mechanisms 140 which are provided to the housing 110 of the payload, and, accordingly, the unintentional undocking of said unmanned aircraft apparatus 200 from the housing 110 of the payload. Of note, in this embodiment of the present invention, the limiting member may be actuated mechanically (for example, as a result of contact interaction with the housing 210 of the unmanned aircraft apparatus or as a result of pressing the housing 210 of the unmanned aircraft apparatus thereonto). For example, in this embodiment of the present invention, the limiting member may be configured in the form of a spring-loaded element. Alternatively, in this embodiment of the present invention, the limiting member may be configured controllable, and the control device of the payload 100 may be communicatively coupled to such controllable limiting member so as to enable actuation thereof. In one of the variations of such embodiment of the present invention, the limiting member, which may be further provided to the housing 110 of the payload, may be configured to be actuated upon introducing at least one of the toothed guides of the unmanned aircraft apparatus 200 into a detachable toothed interaction with a respective one of the toothed docking mechanisms 140 which are provided to the housing 110 of the payload. In another variation of this embodiment of the present invention, the limiting member, which may be further provided to the housing 110 of the payload, may be configured to be actuated by the control device of the payload 100 in response to readings from a contact sensor which may be communicatively coupled to the control device of the payload 100 and configured to detect or identify the docking of the unmanned aircraft apparatus 200 to the housing 110 of the payload. In another variation of such embodiment of the present invention, the limiting member may be installed on the housing 110 of the payload, on the docking module 130, or on one of the rectilinear toothed guides 230.

As shown in FIGS. 1 and 5-6, the air propulsion units 120 are installed on the docking module 130 such that while docking of the unmanned aircraft apparatus 200 to the docking module 130, whereupon the rectilinear toothed guides 230 enter into a detachable toothed interaction with the respective toothed docking mechanisms 140, these air propulsion units 120 extend through the housing 210 of the unmanned aircraft apparatus, in particular through the internal space or internal cavity of this housing 210, such that, upon placement of the docked unmanned aircraft apparatus 200 in a target location thereof on the housing 110 of the payload, each of the air propulsion units 120 and the air propulsion units 220 occurs to be placed on a respective one of the sides of the housing 110 of the payload. In other words, while placement of the docked unmanned aircraft apparatus 200 in a target location thereof on the housing 110 of the payload, the air propulsion units 120 and the air propulsion units 220 occur to be uniformly distributed around the perimeter of the housing 110 of the payload, wherein the air propulsion units 120 are installed on one pair of the opposite sides of the housing 110 of the payload and the air propulsion units 220 are installed on the other pair of the opposite sides of the housing 110 of the payload. Of note, when the air propulsion units 120 extend through the housing 210 of the unmanned aircraft apparatus, they also extend between the air propulsion units 220.

In one of the embodiments of the present invention, while docking of the unmanned aircraft apparatus 200 to the docking module 130, the air propulsion units 120 may extend under the housing 210 of the unmanned aircraft apparatus or the housing 210 of the unmanned aircraft apparatus may extend over the air propulsion units 120, wherein the air propulsion units 220 extend in the space between the air propulsion units 120.

According to one embodiment of the present invention, at least one or each of the unmanned aircraft apparatuses 200 which are part of the air transport system 1000 may be provided with one rectilinear toothed guide 240, and the docking module 130 or the housing 110 of the payload may be provided with two toothed docking mechanisms 140 configured to substantially simultaneously or sequentially detachably toothedly interact with the rectilinear toothed guide 240 while docking of said unmanned aircraft apparatus 200 to the docking module 130 or to the housing 110 of the payload. In one variation of this embodiment of the present invention, the both toothed docking mechanisms 140 may be arranged in a row on the docking module 130 or on the housing 110 of the payload on one of the sides thereof at a predetermined distance from one another along the width thereof or along the length thereof. In another variation of this embodiment of the present invention, the both toothed docking mechanisms 140 may be arranged in a row on the docking module 130 or the housing 110 of the payload on one of the sides thereof so as to alter the distance therebetween on said side.

According to another embodiment of the present invention, the docking module 130 or the housing 110 of the payload may be provided with a vertical post (not shown) extending, respectively, from the docking module 130 or the housing 110 of the payload from one of the sides thereof, and the toothed docking mechanisms 140 may be arranged in a row on said vertical post such that they are disposed at a distance from one another along the spatial extent, length or height of said vertical post.

According to another embodiment of the present invention, the toothed docking mechanisms 140 may be installed in the docking module 130 or in the housing 110 of the payload so as to enter into toothed interaction with the respective rectilinear toothed guides 230 of the unmanned aircraft apparatuses on different sides of the housing 110 of the payload so as to enable the placement of the air propulsion units 220, which are provided to said unmanned aircraft apparatuses 200, in the same plane on different sides of the housing 110 of the payload or with a predetermined angular offset along the perimeter of the housing 110 of the payload.

According to another embodiment of the present invention, the housing 110 of the payload may be provided with two air propulsion units 120 configured on opposite sides of the housing 110 of the payload, and the toothed docking mechanisms 140 may be installed on the housing 110 of the payload so as to enable the placement of the air propulsion units 120 and the air propulsion units 220 of the unmanned aircraft apparatus in the same plane on different sides of the housing 110 of the payload or with a predetermined angular offset along the perimeter of the housing 110 of the payload upon introducing the rectilinear toothed guide 230 into toothed interaction with said toothed docking mechanisms 140. In one variation of this embodiment of the present invention, the toothed docking mechanisms 140 may be installed on the side of the housing 110 of the payload which side is adjacent to the opposite sides of the housing 110 of the payload which sides are provided with the air propulsion units 120.

According to some other embodiment of the present invention, the housing 110 of the payload may be provided with two air propulsion units 120 provided on opposite sides of the housing 110 of the payload, and the toothed docking mechanisms 140 may be installed on the housing 110 of the payload so as to enable the introduction of the rectilinear toothed guide 230 of the unmanned aircraft apparatus into toothed interaction with said toothed docking mechanisms 140 on one of said opposite sides of the housing 110 of the payload or on the side of the housing 110 of the payload which side is adjacent to said opposite sides of the housing 110 of the payload.

In one of the embodiments of the present invention, the air transport system 1000 may comprise (i) a payload 100 provided with two or more toothed docking mechanisms 140; and (ii) two or more unmanned aircraft apparatuses 200, each of which may be provided with a rectilinear toothed guide 230 configured to enter into a detachable toothed interaction with at least one of said toothed docking mechanisms 140 so as to enable said docked unmanned aircraft apparatus 200 to move with respect to the housing 110 of the payload or the payload 100 itself in general, wherein the housing 210 of at least one of said unmanned aircraft apparatuses 200 may be configured to enable the housing 210 of the other unmanned aircraft apparatus of said unmanned aircraft apparatuses 200 to at least partially extend therethrough while the movement of said at least one unmanned aircraft apparatus 200 or said other unmanned aircraft apparatus with respect to the housing 110 of the payload or the payload 100 itself in general. In one of the variations of this embodiment of the present invention, the toothed docking mechanisms 140 which are provided to the housing 110 of the payload may be installed on the housing 110 of the payload so as to enable the introduction of the toothed guides of the unmanned aircraft apparatuses 200, which must be docked to the payload 100, into toothed interaction with the respective toothed docking mechanisms of the payload of said docking mechanisms 140 on different sides of the housing 110 of the payload. In certain embodiments of the present invention, the toothed docking mechanism 140 may be spring-loaded so as to press against the toothed guide 230. The toothed guide 230 may also be spring-loaded so as to press against the toothed docking mechanisms 140. In another variation of this embodiment of the present invention, the toothed docking mechanisms 140 which are provided to the housing 110 of the payload may be installed on the housing 110 of the payload so as to enable the placement of the unmanned aircraft apparatuses 200, which must be docked to the payload 100, at a predetermined distance along the height of the housing 110 of the payload. In yet another variation of this embodiment of the present invention, the toothed docking mechanisms 140 which are provided to the housing 110 of the payload may be installed on the housing 110 of the payload so as to place the air propulsion units 220 relating to the unmanned aircraft apparatuses 200, which must be docked to the payload 100, in the same plane on different sides of the housing 110 of the payload or with a predetermined angular offset along the perimeter of the housing 110 of the payload.

In another embodiment of the present invention, the above functional elements of the payload 100 may be installed on each of the unmanned aircraft apparatuses 200 being part of the air transport system 1000, and vice versa, the above functional elements of any one of the unmanned aircraft apparatuses 200 may be installed on the payload 100. In particular, in such embodiment of the present invention, the housing 110 of the payload may be provided with one or more rectilinear toothed guides which are structurally and functionally configured analogously to the above rectilinear toothed guides 230 and each of which is configured to detachably toothedly interact with the docking mechanism of the unmanned aircraft apparatus, configured analogously to the above toothed docking mechanism 140, so as to enable the movement of said docked unmanned aircraft apparatus 200 with respect to the housing 110 of the payload along said rectilinear toothed guide, wherein at least one of the toothed guides of the housing 110 of the payload may be further configured to detachably toothedly interact with the toothed docking mechanism of yet another or the other (second) unmanned aircraft apparatus 200 so as to enable the action of said other unmanned aircraft apparatus 200 onto said docked unmanned aircraft apparatus 200 to withdraw the latter from interaction with said at least one toothed guide. In one of the variations of this embodiment of the present invention, at least one of the rectilinear toothed guides of the housing 110 of the payload may be provided with a limiting member configured to limit the movement of the docked unmanned aircraft apparatus 200 along said at least one rectilinear toothed guide. In another variation of this embodiment of the present invention, the housing 110 of the payload may be provided with a limiting member configured to limit the movement of the docked unmanned aircraft apparatus 200 with respect to the housing 110 of the payload. In yet another variation of this embodiment of the present invention, the limiting member, which may be provided to the housing 110 of the payload or to at least one of the rectilinear toothed guides of the housing 110 of the payload, may be configured to actuate while the introduction of the docking mechanism of the unmanned aircraft apparatus 200 into toothed interaction with said at least one toothed guide. In another variation of this embodiment of the present invention, the housing 110 of the payload may be provided with two or more air propulsion units 120, wherein at least one of such air propulsion units 120 may be configured to extend, unfold, or deploy from the housing 110 of the payload. In some variation of this embodiment of the present invention, the air propulsion units 120 which are provided to the housing 110 of the payload may form at least one functional pair of air propulsion units which operates under the control of the control device of the payload 100 and wherein the air propulsion units 120 are disposed on opposite sides of the housing 110 of the payload. In some other variation of this embodiment of the present invention, at least one or each of the air propulsion units 120 which are provided to the housing 110 of the payload may be installed on one of the sides of the housing 110 of the payload so as to alter the location thereof on said side of the housing 110 of the payload. In some other variation of this embodiment of the present invention, the air propulsion units 120 which are provided to the housing 110 of the payload may be installed so as to enable the housing 210 of the unmanned aircraft apparatus to extend therebetween while introduction of the toothed docking mechanism of said unmanned aircraft apparatus 200 into toothed interaction with the rectilinear toothed guide of the housing 110 of the payload. In various variations of this embodiment of the present invention, the housing 110 of the payload may be provided with two rectilinear toothed guides configured to detachably toothedly interact with the docking mechanism of the unmanned aircraft apparatus 200. In various other variations of this embodiment of the present invention, the rectilinear toothed guides which are provided to the housing 110 of the payload may be installed on the housing 110 of the payload on one of the sides thereof at a predetermined distance from one another. In various other variations of this embodiment of the present invention, the toothed guides which are provided to the housing 110 of the payload may be installed on the housing 110 of the payload on one of the sides thereof so as to alter the distance therebetween on said side of the housing 110 of the payload. In some variations of this embodiment of the present invention, the toothed guides which are provided to the housing 110 of the payload may be installed on a vertical post extending from the housing 110 of the payload on one of the sides thereof, and may be disposed at a distance from one another along the spatial extent, length or height of said vertical post. In some other variations of this embodiment of the present invention, the toothed guides which are provided to the housing 110 of the payload may be installed on the housing 110 of the payload so as to introduce the toothed docking modules of the unmanned aircraft apparatuses 200 into toothed interaction with the respective rectilinear toothed guides of the housing 110 of the payload on different sides of the housing 110 of the payload so as to enable the placement of the air propulsion units 220 relating to said unmanned aircraft apparatuses 200 in the same plane on different sides of the housing 110 of the payload or with a predetermined angular offset along the perimeter of the housing 110 of the payload. In some other variations of this embodiment of the present invention, the housing 110 of the payload may be provided with two air propulsion units 120 provided on opposite sides of the housing 110 of the payload, and the rectilinear toothed guides which are provided to the housing 110 of the payload may be installed on the housing 110 of the payload so as to enable the placement of the air propulsion units 120 and the air propulsion units 220 which are provided to the housing 210 in the unmanned aircraft apparatus 200 in the same plane on different sides of the housing 110 of the payload or with a predetermined angular offset along the perimeter of the housing 110 of the payload while introduction of the toothed docking module of the unmanned aircraft apparatus 200 into toothed interaction with said rectilinear toothed guides. In other variations of this embodiment of the present invention, the rectilinear toothed guides which are provided to the housing 110 of the payload may be installed on the side of the housing 110 of the payload which side is adjacent to the opposite sides of the housing 110 of the payload on which sides there are installed the air propulsion units 120. In other variations of this embodiment of the present invention, the housing 110 of the payload may be provided with two air propulsion units 120 provided on opposite sides of the housing 110 of the payload, and the rectilinear toothed guides which are provided to the housing 110 of the payload may be installed on the housing 110 of the payload so as to enable the introduction of the toothed docking module of the unmanned aircraft apparatus 200 into toothed interaction with said rectilinear toothed guides of the housing 110 of the payload on one of said opposite sides of the housing 110 of the payload or on the side of the housing 110 of the payload that is adjacent to the opposite sides of the housing 110 of the payload on which sides there are installed the air propulsion units 120.

According to another embodiment of the present invention, the air transport system 1000 may comprise (i) a payload 100 provided with two or more rectilinear toothed guides, each of which may be configured analogously to any one of the above rectilinear toothed guides 230, (ii) two or more unmanned aircraft apparatuses 200, each of which is provided with a toothed docking mechanism configured analogously to the above toothed docking mechanism 140 and configured to enter into a detachable toothed interaction with at least one of said rectilinear toothed guides of the payload 100 so as to enable the movement of said docked unmanned aircraft apparatus 200 with respect to the housing 110 of the payload along said at least one rectilinear toothed guide of the payload 100, wherein the housing 210 of at least one of said docked unmanned aircraft apparatuses 200 may be configured to enable the housing 210 relating to the other unmanned aircraft apparatus of said docked unmanned aircraft apparatuses 200 to extend therethrough while movement of said at least one unmanned aircraft apparatus 200 or said other unmanned aircraft apparatus 200 along the respective at least one rectilinear toothed guide of the payload 100. In one of the variations of this embodiment of the present invention, the rectilinear toothed guides which are provided to the housing 110 of the payload may be installed on the housing 110 of the payload so as to enable the introduction of the toothed docking mechanisms of the unmanned aircraft apparatuses 200 into toothed interaction with the respective rectilinear toothed guides of said rectilinear toothed guides of the payload 100 on different sides of the housing 110 of the payload. In another variation of this embodiment of the present invention, the rectilinear toothed guides which are provided to the housing 110 of the payload may be installed on the housing 110 of the payload so as to enable the placement of the unmanned aircraft apparatuses 200, docked to the housing 110 of the payload, at a predetermined distance along the height of the housing 110 of the payload or the height of the payload 100. In another variation of this embodiment of the present invention, the rectilinear toothed guides which are provided to the housing 110 of the payload may be installed on the housing 110 of the payload so as to enable the placement of the air propulsion units 220, relating to the unmanned aircraft apparatuses docked to the housing 110 of the payload, in the same plane on different sides of the housing 110 of the payload or with a predetermined angular offset along the perimeter of the housing 110 of the payload.

The provided illustrative embodiments of the present invention, examples and description serve only to facilitate understanding of the principles of the claimed invention and are not limiting. Other possible embodiments of the present invention or modifications or improvements to the above embodiments of the present invention will suggest themselves to one skilled in the art after reading the above description. The scope of the present invention is limited only by the appended claims.

The invention claimed is:

1. A payload comprising:

a housing provided with one or more docking mechanisms, each of which is configured to detachably toothedly interact with a toothed guide of a docked unmanned aircraft apparatus so as to enable a movement of said docked unmanned aircraft apparatus with respect to the housing, wherein at least one of the docking mechanisms is further configured to detachably toothedly interact with a toothed guide of yet another unmanned aircraft apparatus so as to enable a movement of yet another unmanned aircraft apparatus by means of the docking mechanism of the payload towards said docked unmanned aircraft apparatus and the contact action of the housing of said yet another unmanned aircraft apparatus onto the housing of said docked unmanned aircraft apparatus for withdrawal of the latter from interaction with said at least one docking mechanism of the payload.

2. The payload according to claim 1, wherein the housing configured to limit the movement of the unmanned aircraft apparatus with respect to the housing.

3. The payload according to claim 1, wherein the movement of the unmanned aircraft apparatus with respect to the housing is limited upon introduction of the toothed guide of the unmanned aircraft apparatus into toothed interaction with said at least one docking mechanism.

4. The payload according to claim 1, wherein the housing is provided with two or more air propulsion units.

5. The payload according to claim 4, wherein at least one of the air propulsion units of the housing is configured to extend, unfold or deploy from the housing.

6. The payload according to claim 4, wherein the air propulsion units of the housing of the payload form at least one functional pair of air propulsion units, wherein the air propulsion units are disposed on opposite sides of the housing.

7. The payload according to claim 4, wherein at least one of the air propulsion units of the housing is installed on one of the sides of the housing so as to alter a location thereof of the at least one of the air propulsion units on said side of the housing.

8. The payload according to claim 4, wherein the air propulsion units of the housing are installed so as to enable same to extend through the body of the unmanned aircraft apparatus or to enable the housing of the unmanned aircraft apparatus to extend over said air propulsion units upon introduction of the toothed guide of said unmanned aircraft apparatus into toothed interaction with said at least one docking mechanism.

9. The payload according to claim 1, wherein the housing is provided with two docking mechanisms configured to detachably toothedly interact with the toothed guide of the unmanned aircraft apparatus.

10. The payload according to claim 9, wherein said docking mechanisms are installed on one of the sides of the housing at a predetermined distance from one another.

11. The payload according to claim 9, wherein said docking mechanisms are installed on the housing on one of the sides of the housing so as to alter a distance between the docking mechanisms on said side of the housing.

12. The payload according to claim 1, wherein said docking mechanisms are installed on a vertical post extending from the housing on one of the sides of the housing, and are disposed at a distance from one another along a length of the vertical post.

13. The payload according to claim 1, wherein said docking mechanisms are installed on the housing so as to enter into toothed interaction with the toothed guides of the unmanned aircraft apparatuses on different sides of the housing so as to enable the placement of the air propulsion units of said unmanned aircraft apparatuses in the same plane on different sides of the housing or with a predetermined angular offset along the perimeter of the housing.

14. The payload according to claim 1, wherein the housing is provided with two air propulsion units provided on opposite sides of the housing, and said docking mechanisms are installed on the housing so as to enable the placement of the air propulsion units of the housing and the air propulsion units of the unmanned aircraft apparatus in the same plane on different sides of the housing or with a predetermined angular offset along the perimeter of the housing during introduction of the toothed guide of the unmanned aircraft apparatus into toothed interaction with said docking mechanisms.

15. The payload according to claim 14, wherein said docking mechanisms are installed on the side of the housing which is adjacent to said opposite sides of the housing.

16. The payload according to claim 1, wherein the housing is provided with two air propulsion units provided on opposite sides of the housing, and said docking mechanisms are installed on the housing so as to enable the introduction of the toothed guide of the unmanned aircraft apparatus into toothed interaction with said docking mechanisms on one of said opposite sides of the housing or on the side of the housing which is adjacent to said opposite sides of the housing.

17. An air transport system comprising:
a payload provided with two or more docking mechanisms,
two or more unmanned aircraft apparatuses, each of which is provided with a toothed guide configured to enter into a detachable toothed interaction with at least one of said docking mechanisms of the payload so as to enable a movement of said docked unmanned aircraft apparatus with respect to the payload, wherein
the housing of at least one of said unmanned aircraft apparatuses is configured to enable the housing of the other unmanned aircraft apparatus of said unmanned aircraft apparatuses to at least partially extend through the housing of said at least one unmanned aircraft apparatus during a movement of said at least one unmanned aircraft apparatus or said other unmanned aircraft apparatus with respect to the payload.

18. The air transport system according to claim 17, wherein said docking mechanisms are installed on the payload so as to enable the introduction of the toothed guides of said unmanned aircraft apparatuses into interaction with respective docking mechanisms of said docking mechanisms of the payload on different sides of the housing of the payload.

19. The air transport system according to claim 17, wherein said docking mechanisms are installed on the payload so as to enable the placement of said unmanned aircraft apparatuses at a predetermined distance along a height of the payload.

20. The air transport system according to claim 17, wherein said docking mechanisms are installed on the payload so as to enable the placement of the air propulsion units of said unmanned aircraft apparatuses in the same plane on different sides of the payload or with a predetermined angular offset along the perimeter of the payload.

21. A payload comprising:
a housing provided with one or more toothed guides, each of which is configured to detachably toothedly interact with a docking mechanism of an unmanned aircraft apparatus so as to enable a movement of said docked unmanned aircraft apparatus with respect to the housing along said toothed guide, wherein
at least one of the toothed guides of the housing is further configured to detachably toothedly interact with the docking mechanism of yet another unmanned aircraft apparatus so as to enable a movement of yet another unmanned aircraft apparatus by means of the docking mechanism of the payload towards said docked unmanned aircraft apparatus and the contact action of the housing of said yet another unmanned aircraft apparatus onto the housing of said docked unmanned aircraft apparatus for withdrawal of the latter from interaction with said at least one toothed guide of the payload.

22. The payload according to claim 21, wherein at least one of the toothed guides of the housing is configured to limit the movement of the unmanned aircraft apparatus along said at least one toothed guide.

23. The payload according to claim 21, wherein the housing is configured to limit the movement of the unmanned aircraft apparatus with respect to the housing.

24. The payload according to claim 22, wherein the movement of the unmanned aircraft apparatus with respect to the housing is limited upon introduction of the docking mechanism of the unmanned aircraft apparatus into toothed interaction with said at least one toothed guide.

25. The payload according to claim 21, wherein the housing is provided with two or more air propulsion units.

26. The payload according to claim 25, wherein at least one of the air propulsion units of the housing is configured to extend, unfold or deploy from the housing.

27. The payload according to claim 25, wherein the air propulsion units of the housing of the payload form at least one functional pair of air propulsion units, wherein the air propulsion units are disposed on opposite sides of the housing.

28. The payload according to claim 25, wherein at least one of the air propulsion units of the housing is installed on one of the sides of the housing so as to alter a location of said at least one of the air propulsion units on said side of the housing.

29. The payload according to claim 25, wherein the air propulsion units of the housing are installed so as to enable the housing of the unmanned aircraft apparatus to extend while between the air propulsion units during introduction of the toothed docking mechanism of said unmanned aircraft apparatus into toothed interaction with the toothed guide of the housing.

30. The payload according to claim 21, wherein the housing is provided with two toothed guides configured to detachably toothedly interact with the docking mechanism of the unmanned aircraft apparatus.

31. The payload according to claim 30, wherein said toothed guides are installed on one of the sides of the housing at a predetermined distance from one another.

32. The payload according to claim 30, wherein said toothed guides are installed on the housing on one of the sides thereof of the housing so as to alter a distance between the toothed guides on said side of the housing.

33. The payload according to claim 21, wherein said toothed guides are installed on a vertical post extending from the housing on one of the sides of the housing, and are disposed at a distance from one another along a height of the vertical post.

34. The payload according to claim 21, wherein said toothed guides are installed on the housing so as to introduce the docking modules of the unmanned aircraft apparatuses into toothed interaction with respective toothed guides on different sides of the housing so as to enable the placement of the air propulsion units of said unmanned aircraft apparatuses in the same plane on different sides of the housing or with a predetermined angular offset along the perimeter of the housing.

35. The payload according to claim 21, wherein the housing is provided with two air propulsion units provided on opposite sides of the housing, and said toothed guides are installed on the housing so as to enable the placement of the air propulsion units of the housing and the air propulsion units of the unmanned aircraft apparatus in the same plane on different sides of the housing or with a predetermined angular offset along the perimeter of the housing during introduction of the docking module of the unmanned aircraft apparatus into toothed interaction with said toothed guides.

36. The payload according to claim 35, wherein said toothed guides are installed on the side of the housing which is adjacent to said opposite sides of the housing.

37. The payload according to claim 21, wherein the housing is provided with two air propulsion units provided on opposite sides of the housing, and said toothed guides are installed on the housing so as to enable the introduction of the docking module of the unmanned aircraft apparatus into toothed interaction with said toothed guides on one of said opposite sides of the housing or on the side of the housing which is adjacent to said opposite sides of the housing.

38. An air transport system comprising:

a payload provided with two or more toothed guides, two or more unmanned aircraft apparatuses, each of which is provided with a docking mechanism configured to enter into a detachable toothed interaction with at least one of said toothed guides of the payload so as to enable a movement of said docked unmanned aircraft apparatus with respect to the payload along said at least one toothed guide, wherein the housing of at least one of said unmanned aircraft apparatuses is configured to enable the housing of the other unmanned aircraft apparatus of said unmanned aircraft apparatuses to at least partially extend through the housing of said at least one unmanned aircraft apparatus during a movement of said at least one unmanned aircraft apparatus or said other unmanned aircraft apparatus along the at least one toothed guide of the payload.

39. The air transport system according to claim 38, wherein said toothed guides are installed on the payload so as to enable the introduction of the docking mechanisms of said unmanned aircraft apparatuses into toothed interaction with said toothed guides of the payload on different sides of the housing of the payload.

40. The air transport system according to claim 38, wherein said toothed guides are installed on the payload so as to enable the placement of said unmanned aircraft apparatuses at a predetermined distance along a height of the payload.

41. The air transport system according to claim 38, wherein said toothed guides are installed on the payload so as to enable the placement of the air propulsion units of said unmanned aircraft apparatuses in the same plane on different sides of the payload or with a predetermined angular offset along the perimeter of the payload.

\* \* \* \* \*